US010402066B2

(12) United States Patent
Kawana

(10) Patent No.: US 10,402,066 B2
(45) Date of Patent: Sep. 3, 2019

(54) INFORMATION PROCESSING TERMINAL AND CONTROL METHOD

(71) Applicant: CANON KABUSHIKI KAISHA, Tokyo (JP)

(72) Inventor: Yoshimasa Kawana, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 412 days.

(21) Appl. No.: 14/606,933

(22) Filed: Jan. 27, 2015

(65) Prior Publication Data

US 2015/0212706 A1 Jul. 30, 2015

(30) Foreign Application Priority Data

Jan. 30, 2014 (JP) ................ 2014-015339

(51) Int. Cl.
  *G06F 16/245* (2019.01)
  *G06F 16/951* (2019.01)
  *G06F 3/0482* (2013.01)
  *G06F 3/0484* (2013.01)
  *G06F 16/25* (2019.01)

(52) U.S. Cl.
  CPC ........ *G06F 3/04842* (2013.01); *G06F 3/0482* (2013.01); *G06F 16/245* (2019.01); *G06F 16/25* (2019.01); *G06F 16/951* (2019.01)

(58) Field of Classification Search
  CPC .............. G06F 3/0482; G06F 3/04842; G06F 17/30424; G06F 17/30864; G06F 16/951; G06F 16/245
  USPC ...................................................... 707/769
  See application file for complete search history.

(56) References Cited

U.S. PATENT DOCUMENTS

| 7,886,033 B2* | 2/2011 | Hopmann | H04L 12/2807 370/401 |
|---|---|---|---|
| 8,126,395 B2* | 2/2012 | Balgard | G08C 17/02 455/41.2 |
| 8,266,323 B2* | 9/2012 | Cisler | H04L 63/0272 709/245 |
| 8,316,087 B2* | 11/2012 | Asher | H04L 29/06 709/204 |
| 8,316,438 B1* | 11/2012 | Bush | H04L 12/66 726/22 |
| 8,331,908 B2* | 12/2012 | Verthein | H04L 12/2818 455/411 |
| 2004/0109197 A1* | 6/2004 | Gardaz | G06T 3/4092 358/1.15 |
| 2007/0124675 A1* | 5/2007 | Ban | G06F 9/454 715/703 |

(Continued)

FOREIGN PATENT DOCUMENTS

JP 2009-199369 A 9/2009

*Primary Examiner* — Phong H Nguyen
(74) *Attorney, Agent, or Firm* — Canon U.S.A., Inc. IP Division

(57) ABSTRACT

A user agent (UA).1 presents a selection screen for selecting function information for calling a function provided by a service in a network with use of the UA.1. Upon detecting that an import button is pressed on the selection screen, the UA.1 acquires a UA list with use of an Intent technique to display the UA list. Upon a selection of a UA.2 from this list, the UA.1 requests the function information to the UA.2, and presents the selection screen in such a manner that the function information acquired based on the request is further included in the selection screen.

18 Claims, 21 Drawing Sheets

(56) References Cited

U.S. PATENT DOCUMENTS

| | | | |
|---|---|---|---|
| 2007/0271234 A1* | 11/2007 | Ravikiran | G06F 16/2471 707/E17.032 |
| 2008/0049779 A1* | 2/2008 | Hopmann | H04L 12/2807 370/431 |
| 2008/0052384 A1* | 2/2008 | Marl | H04L 12/2807 709/223 |
| 2008/0139116 A1* | 6/2008 | Balgard | G08C 17/02 455/41.2 |
| 2009/0024943 A1* | 1/2009 | Adler | G04G 13/021 715/764 |
| 2011/0137885 A1* | 6/2011 | Isberg | G06F 16/9577 707/709 |
| 2011/0302257 A1* | 12/2011 | Asher | H04L 29/06 709/206 |
| 2014/0026067 A1* | 1/2014 | Park | G06F 16/958 715/748 |
| 2014/0096162 A1* | 4/2014 | Casey | H04N 21/233 725/61 |
| 2016/0012280 A1* | 1/2016 | Ito | G06K 9/00288 382/305 |

* cited by examiner

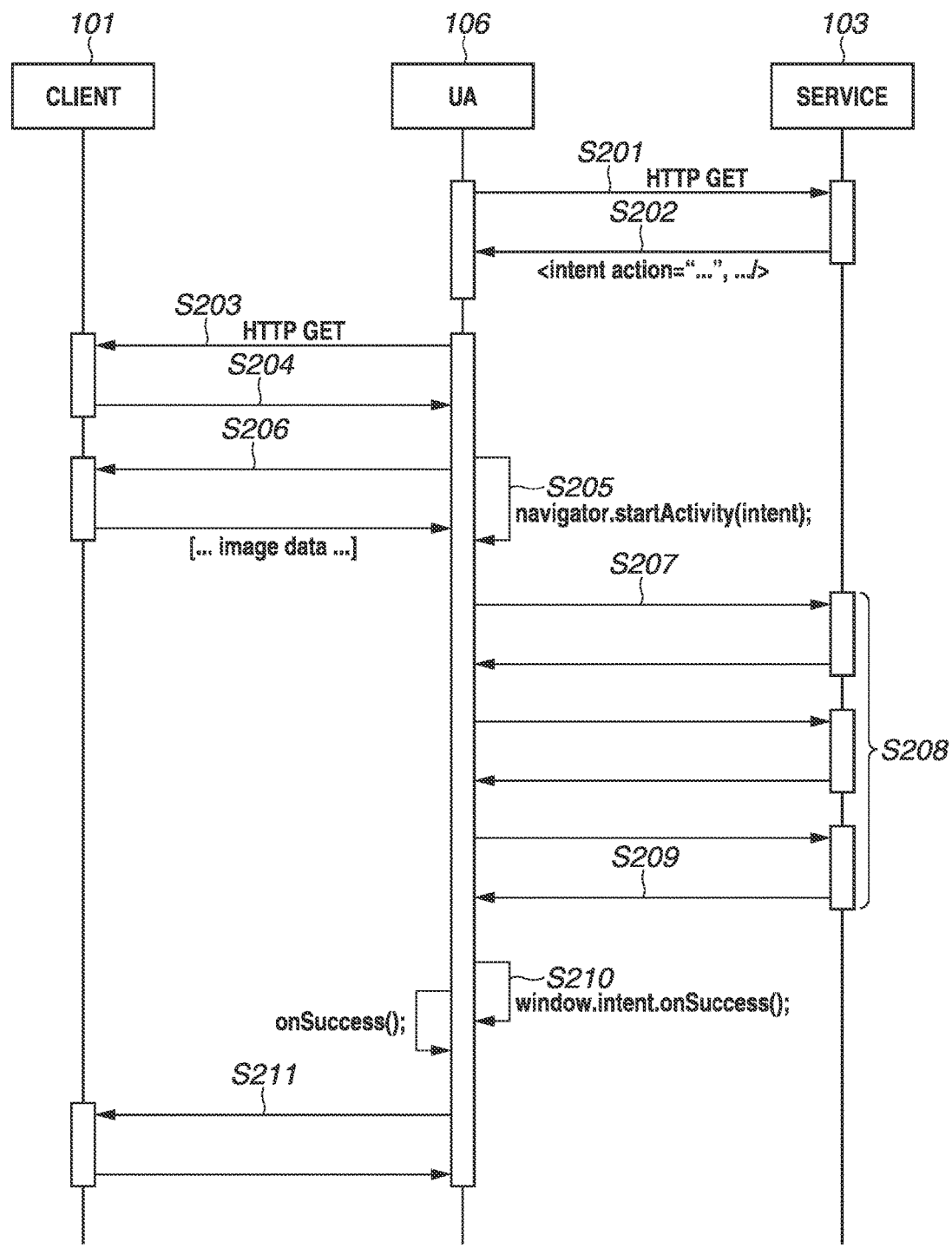

FIG.3A

```
<intent
  action="http://webintents.org/share"
  type="image/*"
  href="share.html"
  title="Share image using e-mail"
  disposition="window"
/>
```

FIG.3B

```
document.getElementById('share-photo').addEventListener(
  "click", function(){
  var intent = new Intent(
      {"action":"http://webintents.org/share",
      "type":"image/jpeg",
     "data":getImageFrom(...)});
  navigator.startActivity(intent, onSuccess);
}, false);
```

FIG.8

WEB INTENTS SERVICE LIST

| WEB INTENTS SERVICE NAME | URI | ACTION | TYPE |
|---|---|---|---|
| INTENTS SERVICE | http://intent-service.com | SHARE | image/* |
| PHOTO SHARES | http://photo-shares.com | SHARE | image/* |
| ... | ... | ... | ... |
| 1401 | 1402 | 1403 | 1404 |

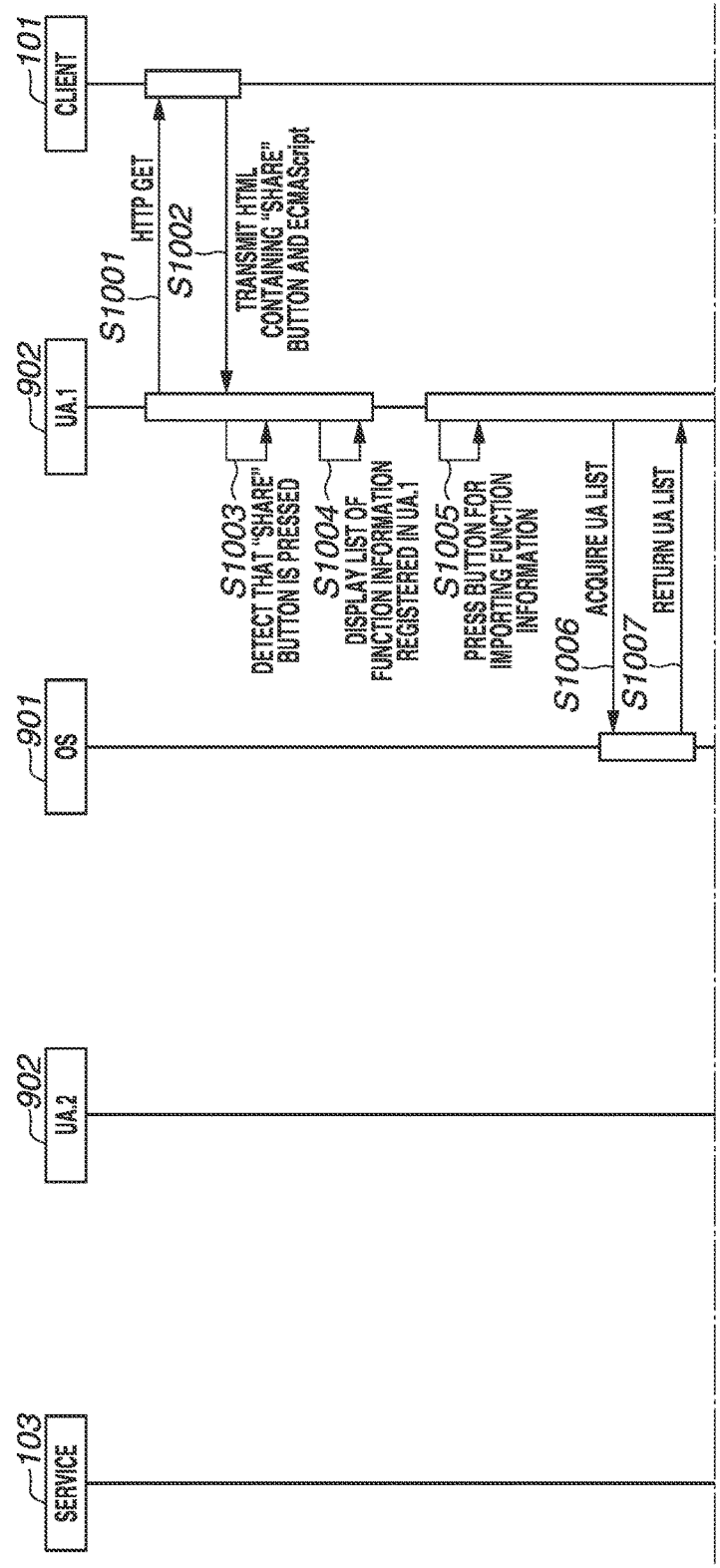

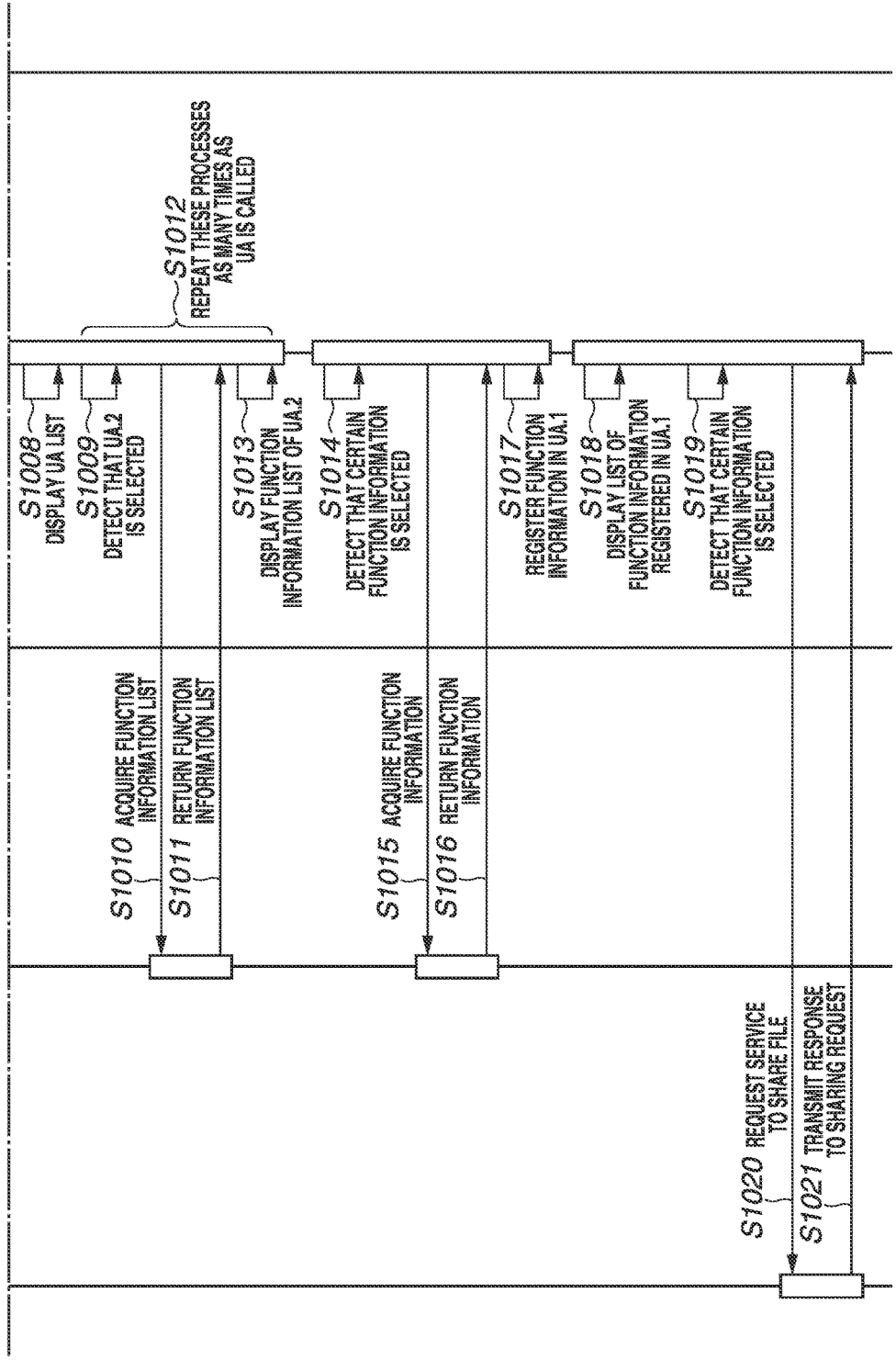

FIG.13

DATA FILE TRANSMITTED AS INTENT

| FILE TYPE | application/WebIntentsService | |
|---|---|---|
| | SERVICE NAME | INTENTS SERVICE |
| | URI | http://intent-service.com |
| | ACTION | PICK |
| | TYPE | image/* |

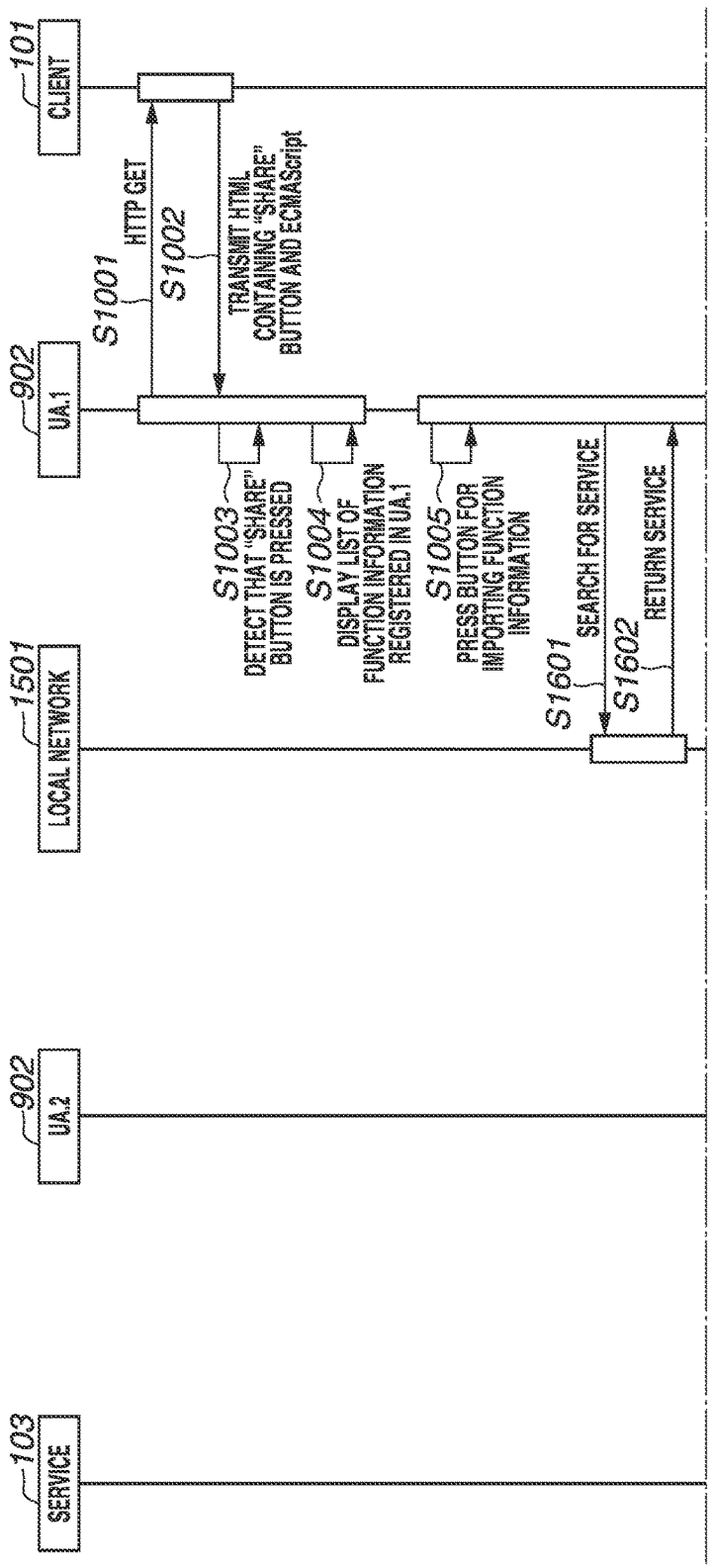

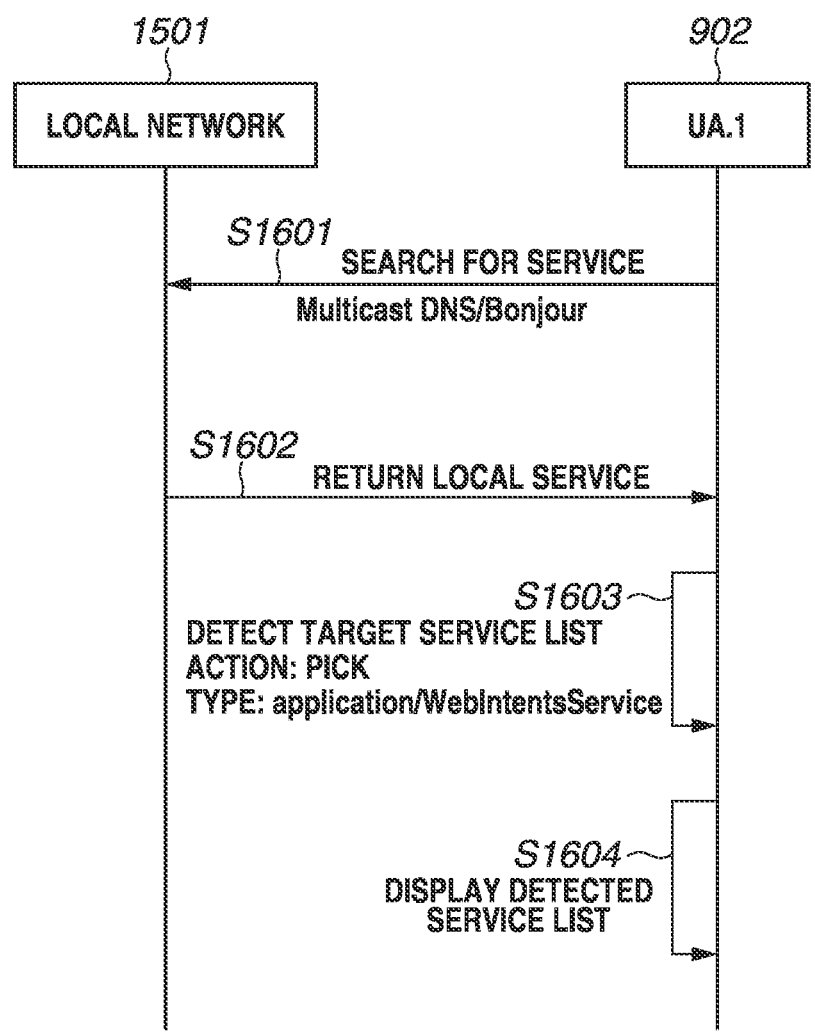

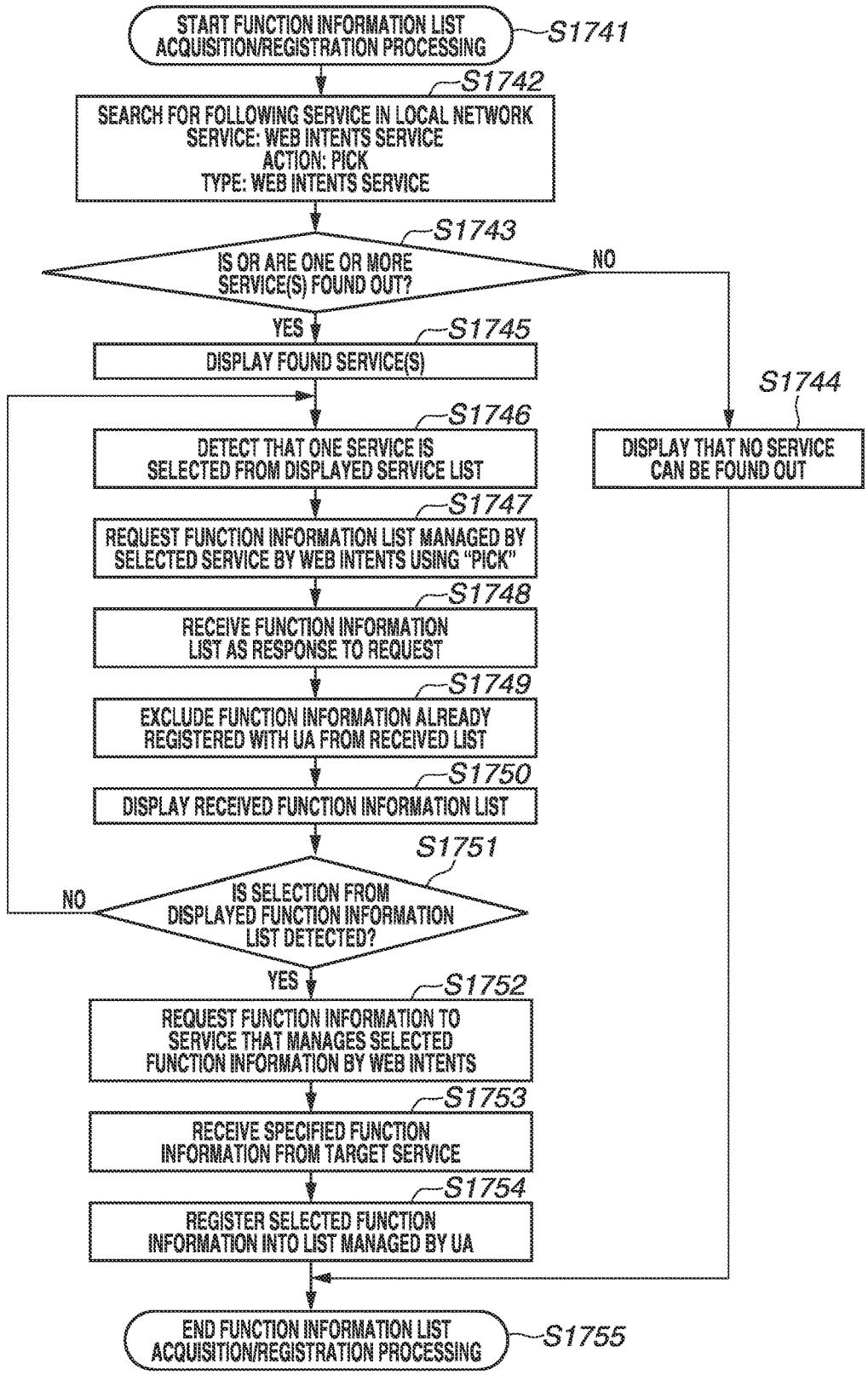

INFORMATION PROCESSING TERMINAL AND CONTROL METHOD

BACKGROUND OF THE INVENTION

Field of the Invention

The present invention relates to a technique useful when a service using a mechanism such as "Web Intents" is provided.

Description of the Related Art

Conventionally, a transfer of processing between websites has required a function calling-side to know how to call a function such as an Application Programming Interface (API) or a Representative State Transfer (REST) interface of a function provider-side. Therefore, the function calling-side has had to perform processing of the calling-side according to each calling rule to realize cooperation with a different website. Further, authentication by the function provider-side is often required to allow the function calling-side to use the function. Therefore, the function user-side has had to store authentication information of the function provider-side or use an authentication foundation such as Security Assertion Markup Language (SAML). However, the storage of the authentication information may lead to the necessity of correctly and safely managing this authentication information, and the use of the authentication foundation such as SAML requires establishment of an agreement in advance between the function provider and the function user. These requirements have imposed a burden on the function user.

For example, conventionally, Japanese Patent Application Laid-Open No. 2009-199369 has discussed a technique for using a service provided on the Web.

There are also mechanisms that realize cooperation with an arbitrary web service (or a web application) without requiring using a special API. As one example thereof, there is proposed a mechanism called Web Intents that loosely couples a service receiver-side and a service provider-side by late runtime binding to realize cooperation therebetween.

According to the new cooperation mechanism such as the above-described Web Intents mechanism, a user agent (UA) processes a HyperText Markup Language (HTML) document that contains a markup for registering function information of a provided function and registers the function information as a Web Intent to use the provided function offered by a service in this mechanism. The UA can request execution of the provided function by connecting to the service with use of the function information registered in the UA. However, when there is a plurality of relay functions in an information processing terminal, processing for registering the function information is performed for each relay function individually, and the function information is managed for each relay function individually. Therefore, even if certain function information is registered for a certain relay function, this function information cannot be used from the other relay functions. Therefore, a user repeatedly have to perform the registration processing for each relay function even for the same function information, and thus this mechanism is not necessarily sufficiently user-friendly.

Therefore, various refinements to improve the usability will be further demanded, regarding the request to the service with use of this Web Intent and the registration of the Web Intent.

SUMMARY OF THE INVENTION

According to an aspect of the present invention, an information processing terminal includes a plurality of relay functions each configured to relay service provision between a client configured to manage data and a service configured to provide a function with use of the data via a network, a presentation unit configured to present a selection screen for selecting function information for calling the function provided by the service with use of a first relay function, and a request unit configured to request the function information from the first relay function to a second relay function. The presentation unit presents the selection screen in such a manner that the function information acquired based on the request by the request unit is included in the selection screen.

Further features of the present invention will become apparent from the following description of exemplary embodiments with reference to the attached drawings.

BRIEF DESCRIPTION OF THE DRAWINGS

FIG. 2 is a sequence diagram illustrating an example of an overview of a basic operation of the Web Intents mechanism.

FIGS. 3A and 3B illustrate an example of a registration markup and an example of a processing request in the Web Intents mechanism, respectively.

FIG. 8 is an example of a table containing function information managed by the web browser.

FIG. 9 (consisting of FIGS. 9A and 9B) is a sequence diagram illustrating an operation of mutually using the function information according to a first exemplary embodiment.

FIG. 13 illustrates an example of a definition file of the function information.

FIG. 17 is a detailed sequence diagram illustrating a part of the sequence illustrated in FIG. 16.

FIG. 18 is a flowchart illustrating processing for mutually using the function information according to the second exemplary embodiment.

DESCRIPTION OF THE EMBODIMENTS

In the following description, exemplary embodiments of the present invention will be described with reference to the drawings.
<Basic Concept of how Web Intents Mechanism Works>

The Web Intents mechanism is one example of a mechanism that realizes cooperation with an arbitrary web service (or a web application) without use of a special API. First, a basic concept of how the Web Intents mechanism works will be described with reference to FIGS. 1 to 3. In the exemplary embodiments of the present invention, the Web Intents mechanism is employed as a specific example, but another similar mechanism can be also employed as a technique for realizing cooperation with an arbitrary web service (or a web application).

Figure 1:
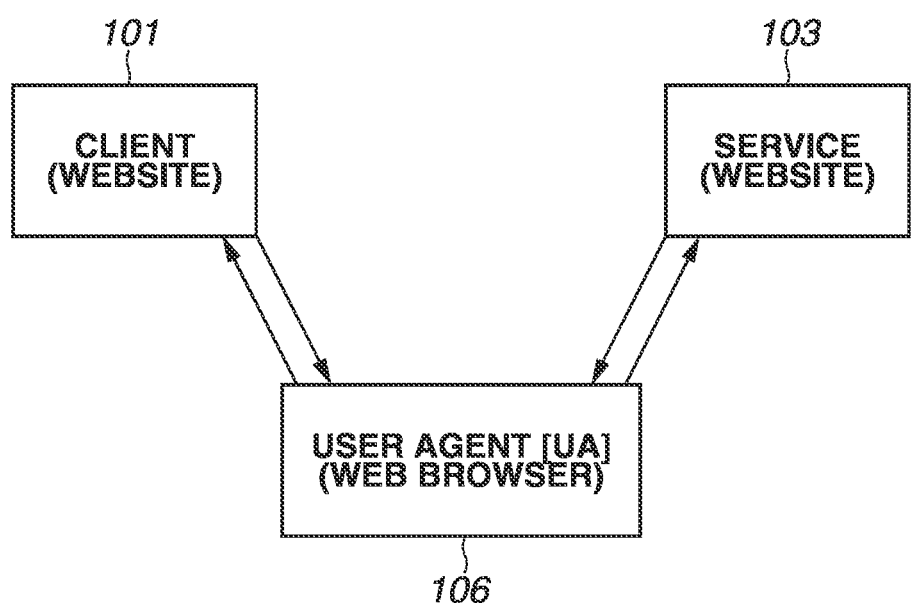
FIG. 1 is a block diagram illustrating an example of a basic system configuration of a Web Intents mechanism.

FIG. 1 is a block diagram illustrating an entire configuration of the Web Intents mechanism.

In FIG. 1, a Web Intents service (hereinafter referred to as a service) 103 provides a service or a function with use of the Web Intents technique. A Web Intents client (hereinafter referred to as a client) 101 uses the service 103. A User Agent (hereinafter referred to as a UA) 106 plays a role of transferring a request from the client 101 to the service 103 and transferring a result from the service 103 to the client 101. The UA 106 can be considered as a relay function for carrying out a request and transferring data between the client 101 and the service 103. Further, a Web Intent, which is function information for calling a provided function of the service 103, is registered in the UA 106.

In the present mechanism, for example, the client 101 is a website that manages data and has a button for calling the service 103 and the like disposed thereon, and the UA 106 is a web browser (a browser) that displays this website. Further, the service 103 is a website serving as a cooperation destination of the client 101, which receives the data managed by the client 101 via the UA 106 and processes the received data.

For example, if this mechanism is applied to a social networking service (SNS), the service 103 corresponds to a posting destination service that receives posting of photographs and comments managed by the client 101 to constitute a site for viewing them. If social buttons such as "Like", "Check", and "Share" on an SNS site are likened to the Web Intents mechanism, the client 101 corresponds to a website where the buttons are disposed. The UA 106 corresponds to a web browser. The service 103 corresponds to a service to which a comment such as "Like" is posted. If user authentication or an operation by a user is required when the service 103 provides the function, the user carries out the operation on the UA 106.

The UA 106 can be realized by not only the web browser but also an operating system (OS), an application, and the like that operate on an information processing terminal, as long as it has a function for cooperating with the service 103 that will be described below. Examples of the information processing terminal include a personal computer, a smartphone, a tablet-type computer, and a car navigation system.

Further, regarding the service 103, for example, a device such as a camera, a printer, and a scanner mounted in the information processing terminal, other than a service provider in the Internet, such as the above-described positing destination service, can also become the service provider. Further, regarding the service 103, a peripheral device such as a printer, a scanner, and a network camera, a home appliance such as a refrigerator and a television, and the like connected via a network can also become the service provider. Further, the same also applies to the client 101, and various kinds of devices and applications mounted or installed in the information processing terminal, a peripheral device and a home appliance in a network, a program that runs thereon, and the like can also become the user that calls the service. Among the client 101, the UA 106, and the service 103, an arbitrary combination thereof may operate in a same system. More specifically, one possible example thereof is such a case that a document edition application or the like having a function equivalent to the web browser operates as a configuration including the client 101 and the UA 106. Further, some of the client 101, the UA 106, and the service 103 may be functions that operate on a same apparatus.

<Examples of Sequence Diagram and Data of Web Intents Mechanism>

FIG. 2 is a sequence diagram illustrating a basic operation regarding service provision with use of the Web Intents mechanism.

In step S201, the UA 106 accesses the service 103 in response to a user's operation. In step S202, the service 103 returns an HTML response that contains a registration markup for registering the function provided by the service 103 in the UA 106, to the UA 106.

FIG. 3A illustrates an example of the HTML document returned from the service 103 to the UA 106 in step S202. Now, the content of the HTML document returned from the service 103 to the UA 106 will be described with reference to the example illustrated in FIG. 3A.

Function information for identifying the function provided by the service 103 and calling the function provided by the service 103 is described in an <intent> tag. In this tag, "action" indicates category information (a category) of the provided function. In other words, "action" indicates the category information specifying what kind of function or service is offered by the provided function. Examples of the category information of the provided function include "Share", which is category information corresponding to a function of sharing data, "Edit", which is category information corresponding to a function of editing data, "View", which is category information corresponding to a function of viewing data, "Pick", which is category information corresponding to a function of acquiring data, and "Save", which is category information corresponding to a function of saving data. In other words, for example, any one of kinds of category information among "Share", "Edit", "View", "Pick", and "Save" is described in the above-described function information as the category information.

Further, "type" indicates a type of data or the like that the provided function can handle. In other words, "type" indicates a data type or the like that can be handled with respect to "action". Further, "href" indicates a connection destination (Uniform Resource Locator (URL)) of the provided function. Further, "title" indicates a title of the provided function. Further, "disposition" indicates how the called provided function is displayed.

In the example illustrated in FIG. 3A, the category of the provided function is "share (sharing)". The type of the data or the like that the provided function can handle is "image data in any format (*)". The connection destination is "share.html". Further, the title is "Share image using e-mail". Further, this example indicates that this function will be displayed in another window via the UA 106.

Upon receiving the HTML reply in step S202, the UA 106 confirms to the user whether to register the provided function of the service 103 in the UA 106. For example, if the UA 106 is a web browser, the UA 106 displays a pop-up window, and prompts the user to select whether to register the function. If the user selects registration of this provided function as a Web Intent, the UA 106 performs registration processing for storing the information received in step S202 into the UA 106. More specifically, the information received in step S202 is stored in a storage area of the information processing terminal on which the UA 106 operates, and is registered in the UA 106 as a Web Intent.

In step S203, the UA 106 accesses the client 101 in response to a user's operation. In step S204, the client 101 returns an HTML document in which use of the provided function (the Web Intent) of the service 103 is described, to the UA 106. For example, if an image and a "share" button are supposed to be displayed on the website as the client 101, this website returns an HTML document that contains a European Computer Manufacturers Association (ECMA) Script as illustrated in FIG. 3B, which is a request to process the Web Intent, to the UA 106.

FIG. 3B illustrates an example of the HTML document returned from the client 101 to the UA 106 in step S204. Now, the content of the HTML document returned from the client 101 to the UA 106 will be described with reference to the example illustrated in FIG. 3B.

The ECMAScript indicates that clicking a button having an identification (ID) "share-photo" in the HTML triggers execution of a specified unnamed function. First, the unnamed function creates a new Intent object, and calls a startActivity( ) function using this object as an argument. When this function is executed, the UA 106 extracts Web Intents each having an action and a type that match those of a specified Web Intent object among Web Intents registered in the UA 106 to then display them as a list, thereby requesting the user to select one of them. Further, the UA 106 acquires image data held by the client 101 by executing a getImageFrom( ) function called in the unnamed function.

In step S204, the UA 106 receives the HTML document transmitted from the client 101, and displays a screen based on this HTML document. In step S205, upon detecting that the "share" button on the screen is pressed by the user, the UA 106 executes the ECMAScript for launching the Web Intents mechanism as described above. Then, in step S206, the UA 106 acquires the image data held by the client 101. Further, when detecting that the "share" button is pressed in step S205, the UA 106 displays the list of the Web Intents registered in the UA 106. Upon detecting that the Web Intent indicating the provided function of the service 103 is selected from the displayed list by the user, in step S207, the UA 106 transmits a HyperText Transfer Protocol (HTTP) request (a Web Intents processing request) to the service 103 that offers the selected provided service. At this time, the UA 106 adds the content of the Web Intent object created by the ECMAScript illustrated in FIG. 3B to the transmission data.

Upon receiving the HTTP request transmitted from the UA 106 in step S207, then in step S208, the service 103 extracts the Web Intent object from the HTTP request, and realizes use of the selected provided function ("share" of the image data of the client 101 in this example) while interacting with the user via the UA 106.

For example, the user visits a site of a web storage (the client 101) managing photograph data that includes a button for calling Web Intents on a web browser (the UA 106), and presses this button. Then, the web browser (the UA 106) displays a pop-up window that includes a list of registered services. If the user selects a web-based electronic mail function in this pop-up window as the service 103, a site that provides this function is displayed in another window, and a new electronic mail to which photograph data is attached is created in this window as a processing result. As a result, the user can transmit the electronic mail.

Upon completion of the processing regarding the provided function, in step S209, the service 103 returns a reply that contains an ECMAScript notifying the client 101 of the processing result, to the UA 106. Upon receiving the reply transmitted in step S209, then in step S210, the UA 106 executes the ECMAScript contained in this reply, and calls a callback function onSuccess( ) specified as an argument in the startActivity( ) function executed in step S205. In step S211, the UA 106 returns the processing result to the client 101 by this callback function onSuccess( ).

This processing allows the client 101 to call the function ("share" of an image in this example) in the Web Intents mechanism that is provided by the service 103, via the UA 106.

<Example of UI of Information Processing Terminal According to Present Exemplary Embodiment>

Figure 4:
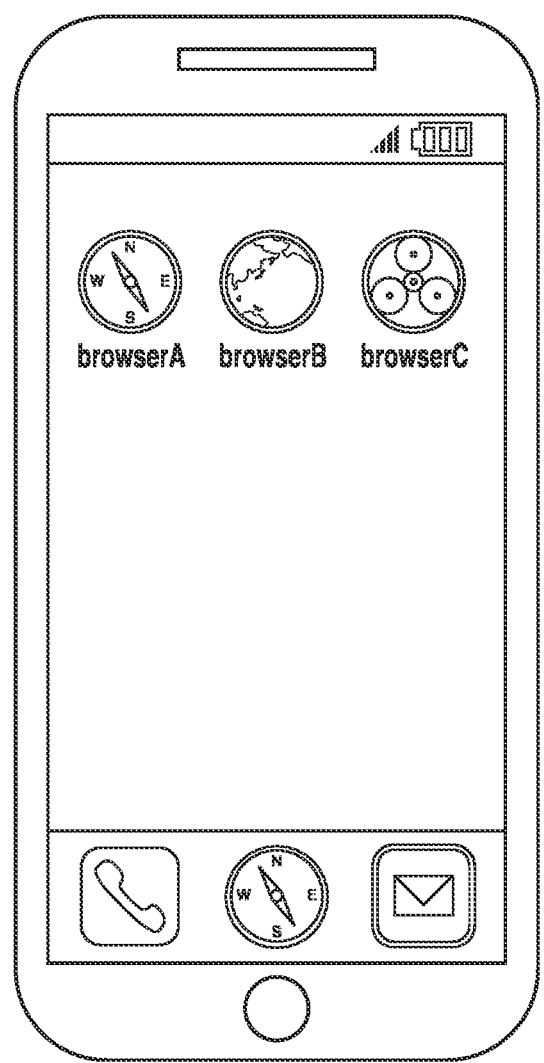
FIG. 4 illustrates an example of a user interface (UI) of an information processing terminal in which a plurality of browsers is installed.

FIG. 4 illustrates an example of a user interface (UI) of an information processing terminal according to the present exemplary embodiment.

In FIG. 4, an information processing terminal 501 is, for example, a commonly-used mobile terminal or smartphone. An OS such as Android (registered trademark), which is a platform developed for mobile information terminals, is installed in the information processing terminal 501.

In the example illustrated in FIG. 4, a plurality of web browsers (browserA, browserB, and browserC) is installed in the information processing terminal 501 as application programs. Each of these web browsers corresponds to the UA 106 illustrated in FIG. 1, and can use the Web Intents mechanism. In other words, the information processing terminal 501 includes a plurality of relay functions in the Web Intents mechanism.

When finding out a service corresponding to the service 103 illustrated in FIG. 1 while using the web browser, the user registers the service in the web browser if necessary. A list including a plurality of services managed by the web browser is prepared for each web browser. Therefore, normally, Web Intents registered in the web browser are different for each web browser.

Further, the present exemplary embodiment will be described with use of the smartphone-type information processing terminal illustrated in FIG. 4, but the type of the information processing terminal as the platform is not limited, and the present exemplary embodiment can be also applied to a commonly-used computer (for example, a personal computer).

<Example of Hardware Configuration of Client 101 and Service 103>

Figure 5:
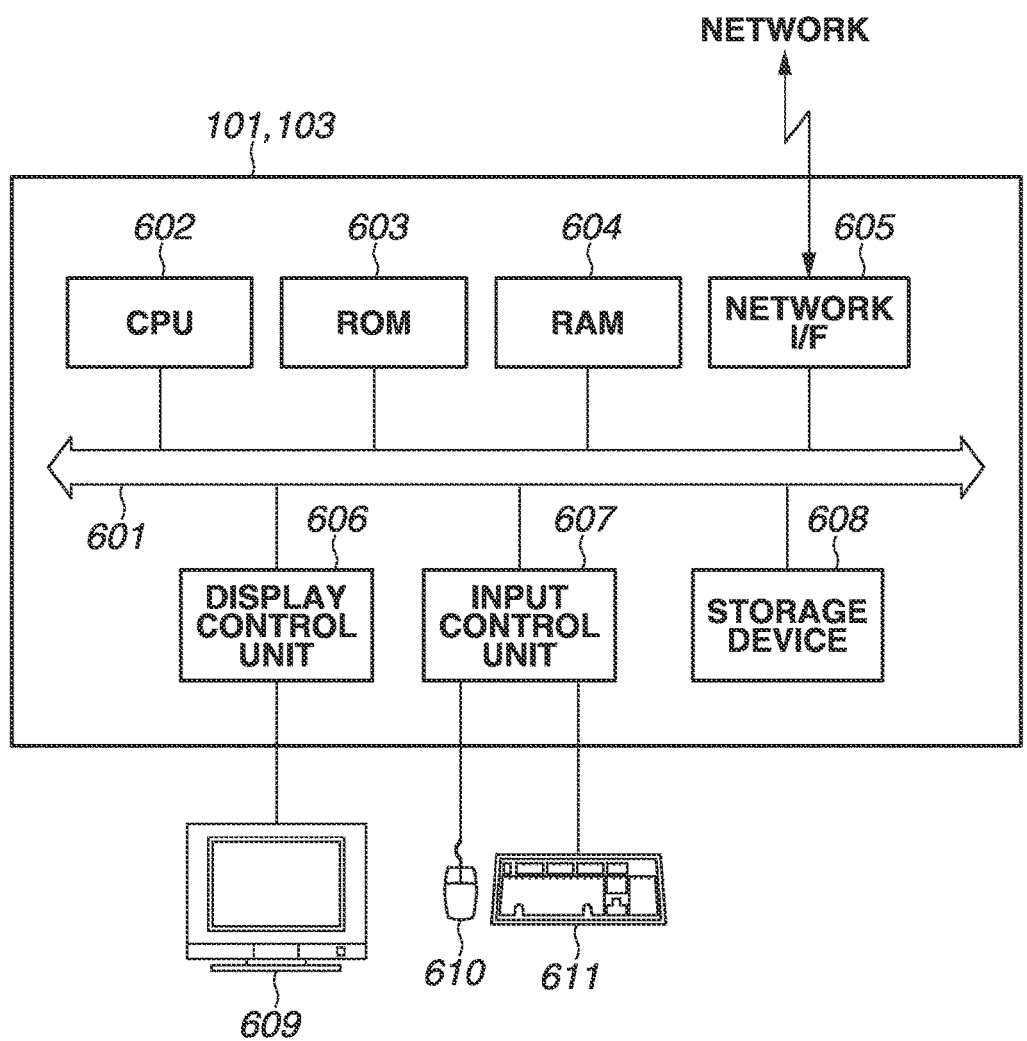
FIG. 5 is a block diagram illustrating an example of a hardware configuration of each of a client and a service.

FIG. 5 is a block diagram illustrating an example of a hardware configuration of each of the client 101 and the service 103 illustrated in FIG. 1.

Each of the client 101 and the service 103 can be embodied by a general-purpose computer or the like. Each of the client 101 and the service 103 includes a central processing unit (CPU) 602, a read only memory (ROM) 603, and a random access memory (RAM) 604. The CPU 602 reads out and executes a program stored in the ROM 603 or a storage device 608 that will be described below, thereby comprehensively controls the entire apparatus. The ROM 603 is a read-only memory for storing a boot program is to launch a system. The RAM 604 is a work memory when the CPU 602 executes the program.

A network interface (NETWORK I/F) 605 performs communication via a network (NETWORK). A display control unit 606 controls a display of a display device 609. For example, the display control unit 606 controls a screen display for, for example, managing a web server. The display device 609 displays an output signal controlled by the display control unit 606 to an operator that is a web server administrator. An input control unit 607 controls an input signal received from an input device 610 or 611. The input device 610 is, for example, a pointing device such as a mouse. The input device 611 is, for example, a keyboard. The input devices 610 and 611 each receive an input from the operator.

The storage device 608 is a nonvolatile storage device such as a magnetic disk and a flash memory that stores the program to be executed by the CPU 602 and various kinds of information. In the case of the client 101, the storage device 608 also stores, for example, content information that the client 101 provides. Further, in a case of the service 103, the storage device 608 also stores, for example, data and a program required for the service 103 to provide the function.

The CPU 602 of each of the client 101 and the service 103 reads out and executes the program stored in the storage device 608, by which processing by each of the client 101 and the service 103 that will be described in the present exemplary embodiment is realized.

<Example of Hardware Configuration of Information Processing Terminal 501>

Figure 6:
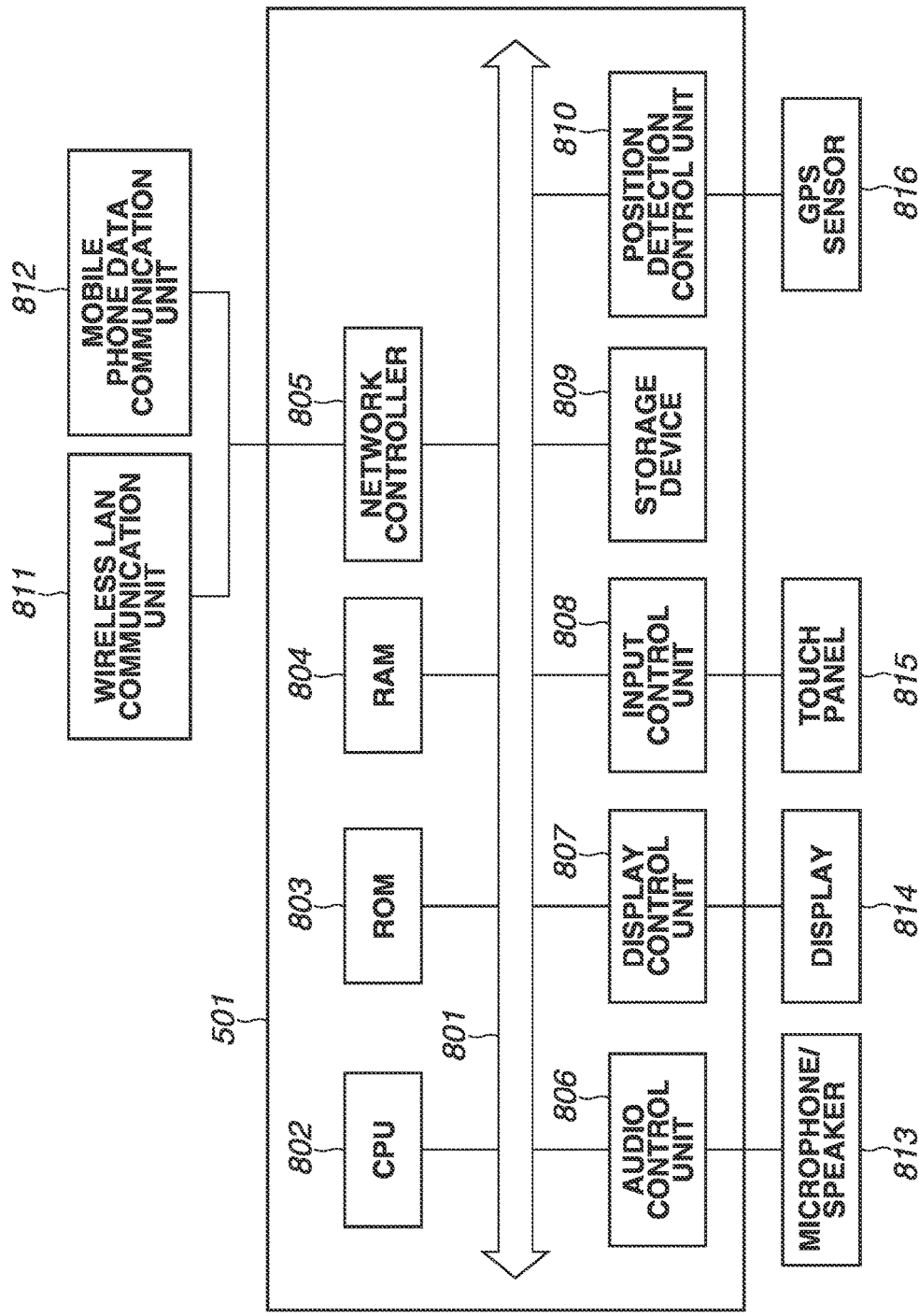
FIG. 6 is a block diagram illustrating an example of a hardware configuration of the information processing terminal including a UA.

FIG. 6 is a block diagram illustrating a hardware configuration of the information processing terminal 501, and the UA 106 illustrated in FIG. 1 is executed on this hardware. The information processing terminal 501 illustrated in FIG. 6 is a commonly-used mobile terminal or smartphone. The operating system designed for small terminals, and programs for controlling a phone call and data communication are operating on the information processing terminal 501.

Components of the hardware of the information processing terminal 501 are connected to a system bus 801. A ROM 803 stores the operating system in the information processing terminal 501, the applications for controlling a phone call and data communication, and the like, which are read out to be executed by a CPU 802. Examples of the application for controlling data communication include electronic mail software and a web browser.

A RAM 804 is a work memory area for executing the program. Further, the RAM 804 is also a memory for temporarily storing webpage data that the web browser acquires from a web server, authentication information for accessing a web service, and the like. A storage device 809 is a nonvolatile storage device, and stores various kinds of operation mode settings, an operation log, and the like that is to be stored even after the information processing terminal 501 is restarted.

A network controller 805 controls communication of a wireless local area network (LAN) communication unit 811 for participating in a wireless LAN, and a mobile phone data communication unit 812 for participating in a network provided by a mobile phone carrier. Generally, when the information processing terminal 501 can participate in the network of the wireless LAN, the network controller 805 prioritizes a connection to the wireless LAN via the wireless LAN communication unit 811. When the information processing terminal 501 is located outside a network area covered by the wireless LAN, the network controller 805 participates in the wireless communication network provided by the mobile phone carrier via the mobile phone data communication unit 812.

An audio control unit 806 is used mainly when the phone call application is launched and the user is speaking on a phone. Audio data is input and output by a microphone/speaker 813, and the audio control unit 806 is in charge of mediation with a control program thereof. A display control unit 807 controls information to be output by a display 814 of the information processing terminal 501. An input control unit 808 controls information instructed by the user via a button or a touch panel 815 of the information processing terminal 501. Applications in the information processing terminal 501 present network communication information and various kinds of information of the information processing terminal 501 to the user with use of these audio control unit 806, display control unit 807, and input control unit 808. A position detection control unit 810 acquires positional information of the information processing terminal 501 from a global positioning system (GPS) sensor 816, and provides the acquired information to the operating system. These control operations are under control of the operating system that is running on the CPU 802.

The CPU 802 in the information processing terminal 501 reads out and executes the program stored in the ROM 803, by which the UA 106 according to the present exemplary embodiment is realized.

<Example of Software Configuration of Information Processing Terminal 501>

Figure 7:
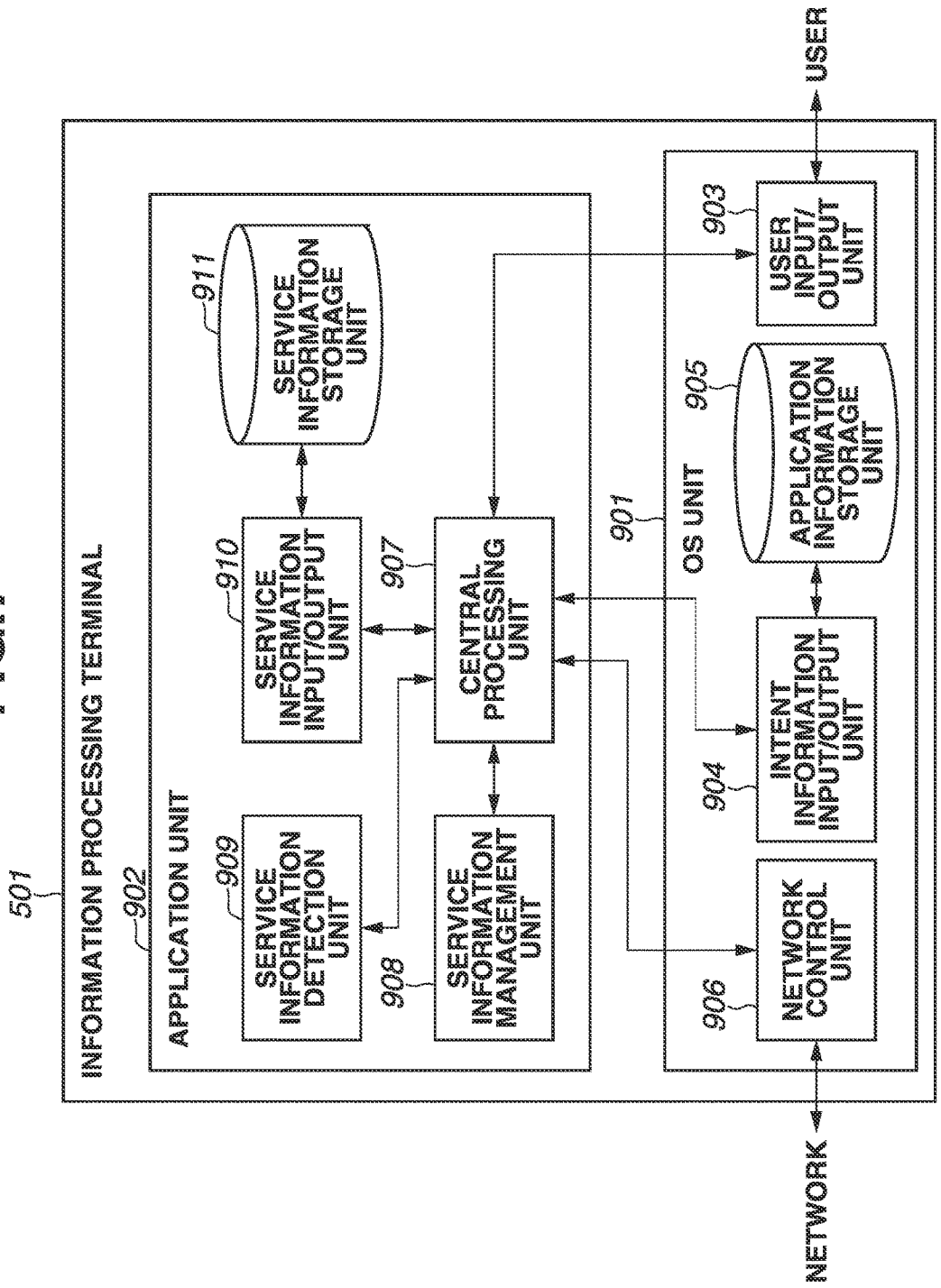
FIG. 7 is a block diagram illustrating an example of a software configuration of the information processing terminal including the UA.

FIG. 7 is a block diagram illustrating a software configuration of the information processing terminal 501 illustrated in FIG. 4. The software configuration illustrated in FIG. 7 will be described, mainly focusing on a technique of the application relating to the present exemplary embodiment regarding issue of a Web Intents request, and a function of the application relating to the present exemplary embodiment regarding mutual use of function information with use of an Intent technique. The Intent technique is a technique for transmitting and receiving data between arbitrary applications. This is a technique usable on Android (registered trademark), which is the platform developed for mobile information terminals. Further, a similar technique is also implemented on another platform, but in the present exemplary embodiment, the technique for transmitting and receiving data between applications in the information processing terminal 501 will be referred to as the Intent technique.

In FIG. 7, the information processing terminal 501 corresponds to the information processing terminal 501 illustrated in FIG. 4. In FIG. 7, the information processing terminal 501 will be described as a mobile terminal or a smartphone. Generally, an operating system (hereinafter referred to as an OS) for controlling a device is operating on an information processing terminal. In FIG. 7, such an OS is illustrated as an OS unit 901. Further, a plurality of applications can be installed in the information processing terminal 501. In FIG. 7, each of these applications is illustrated as an application unit 902. FIG. 7 illustrates only a single application unit 902, but actually, the plurality of applications is installed in the information processing terminal 501.

The present exemplary embodiment is based on the assumption that the information processing terminal 501 is used under such an environment that the plurality of applications, each of which operates as the UA 106 illustrated in FIG. 1 on the operating system in the information processing terminal 501, works in the information processing terminal 501. The present exemplary embodiment will be described while using the web browser as one example of the application that is operating as the UA 106, but this application may be any application that can operate as the UA 106. For example, an application such as spreadsheet software may provide the function of the UA 106. Further, an example in which the OS operates as the UA 106 is also included in the present exemplary embodiment.

The application assumed to be used in the present exemplary embodiment is an application that can control the Web Intents mechanism as the UA 106, like the web browser, and at the same time, an application that can transmit and receive data between applications. As the technique for transmitting and receiving data between applications, there is the Web Intents mechanism and the like, other than the Intent technique. In the first exemplary embodiment, data is transmitted and received between applications with use of the Intent technique. Further, in a second exemplary embodiment (described below), data is transmitted and received between applications with use of the Web Intents mechanism. However, the technique assumed to be used here may be any technique that allows data to be transmitted and received between arbitrary applications, and is not especially limited to the Intent technique and the Web Intents mechanism.

The CPU 802 in the information processing terminal 501 reads out and executes the OS and the application program stored in the ROM 803, by which the OS unit 901 and the application unit 902 illustrated in FIG. 7 are realized.

First, the OS unit 901 will be described.

The OS unit 901 includes a network control unit 906. The network control unit 906 controls the network controller 805 illustrated in FIG. 6. The information processing terminal 501 is assumed to be used while the user is moving because it is a small mobile terminal, and the network control unit 906 automatically connects to an accessible network according to a location at that time. Further, the network control unit 906 performs outward communication in response to a communication request from the application unit 902. Further, the network control unit 906 deals with a network connection request from the outside, and transfers the connection request to an appropriate application unit 902.

The OS unit 901 further includes an Intent information input/output unit 904, and an application information storage unit 905. Upon receiving an Intent request from the application unit 902 together with information about an action and a type (hereinafter referred to as a data type), the OS unit 901 requests an application corresponding to these action and data type to the Intent information input/output unit 904. Upon receiving the Intent request, the Intent information input/output unit 904 acquires a list of applications corresponding to the received action and data type from the application information storage unit 905. Then, the Intent information input/output unit 904 transmits the acquired application list to the application unit 902.

Further, the OS unit 901 includes a user input/output unit 903, which comprehensively manages the audio control unit 806, the display control unit 807, and the input control unit 808 illustrated in FIG. 6. When an instruction for a display from the application unit 902 to the user is issued, the user input/output unit 903 displays the instructed data onto the display 814 via the display control unit 807. Further, when the user provides an input via the touch panel 815, the user input/output unit 903 transmits an input signal controlled by the input control unit 808 to the application unit 902.

Next, the application unit 902 will be described.

The application unit 902 includes a service information management unit 908, a central processing unit 907, a service information detection unit 909, a service information input/output unit 910, and a service information storage unit 911.

The central processing unit 907 plays a central role as the web browser. A basic role of this central processing unit 907 is the UA 106 in the Web Intents mechanism. Besides that, the central processing unit 907 also performs basic browsing processing, detection of the service 103, data transmission/reception via the Intent technique, and the like. Further, when the Intent technique of the OS unit 901 is not used, the central processing unit 907 can also acquire or provide service information (function information) in the Web Intents mechanism from or to another application with use of the service information management unit 908. The service information management unit 908 will be described in the second exemplary embodiment that will be described below.

The service information detection unit 909 detects the <intent> tag contained in the webpage received from the service 103 when accessing the service 103, and recognizes the function information for registering the function provided by the service 103. The service information input/output unit 910 controls an input and an output of the function information into and from the service information storage unit 911. The service information storage unit 911 stores information illustrated in FIG. 8.

FIG. 8 illustrates an example of the function information managed by the web browser as the UA 106.

For example, in the example illustrated in FIG. 8, the service information storage unit 911 stores information including a name 1401 of a provided function offered by a service, a URI 1402 in the service that accepts the provided function, an action (action) 1403 when a Web Intents request is received, a data type (type) 1404, and the like.

Now, an operation of each module in the application unit 902 will be briefly described.

The user accesses a certain service (a website) that utilizes the Web Intents mechanism, with use of the web browser (corresponding to the UA 106) that is the application in the information processing terminal 501. Then, the service information detection unit 909 in the application unit 902 detects an <intent> tag contained in a webpage received from the service at the time of the access, and recognizes function information for registering a function provided by the service (Web Intents service information). Upon recognizing the function information of the accessed service, the central processing unit 907 prompts the user to select whether to register this function information as a Web Intent via the user input/output unit 903. If the user instructs the information processing terminal 501 to register the function information at this time, the central processing unit 907 issues an instruction to store the function information identified by the above-described <intent> tag to the service information input/output unit 910. Upon receiving the above-described instruction to store the function information, the service information input/output unit 910 stores the above-described function information into the service information storage unit 911.

Further, when the user requests a service to perform processing, the central processing unit 907 acquires function information pieces from the service information storage unit 911 via the service information input/output unit 910. Then, the central processing unit 907 displays a list of the acquired function information pieces, and transmits a Web Intents processing request and content information to a service corresponding to function information selected from this list.

If there is no function information corresponding to the function that the user wants to use in the list of the function information pieces acquired from the service information storage unit 911, this web browser can acquire function information from another web browser with use of the Intent technique. In this case, the central processing unit 907 of the web browser issues a request for acquiring a list of applications that can provide function information, to the Intent information input/output unit 904 in the OS unit 901. Then, as a result of this request, the central processing unit 907 receives the list of applications that provide function information. When the user selects an arbitrary application from this list of applications, the central processing unit 907 issues a request to acquire the function information to the selected application with use of the Intent technique, thereby acquiring the function information.

Further, upon receiving a request to provide the function information (an acquisition request) from an external application with use of the Intent technique, the central processing unit 907 acquires the function information from the service information storage unit 911 via the service information input/output unit 910. Then, the central processing unit 907 provides the acquired function information to the above-described external application.

<Example of Sequence Diagram Regarding Mutual Use of Function Information>

FIG. 9 (consisting of FIGS. 9A and 9B) is a sequence diagram illustrating an example of an operation of referring to and using a list of function information pieces managed by another web browser when the user utilizes the Web Intents mechanism with use of a certain web browser. In FIG. 9, an extension is added to the basic sequence of the Web Intents mechanism that has been described with reference to FIG. 2. In FIG. 9, each of the application units 902 indicates the web browser in the information processing terminal 501, and operates as the UA 106 in the Web Intents mechanism. In FIG. 9, there is a plurality of UAs, and a UserAgent.1 (hereinafter referred to as a UA.1) corresponds to the web browser that requests function information while a UserAgent.2 (hereinafter referred to as a UA.2) corresponds to the web browser that provides the function information.

Figure 10A:
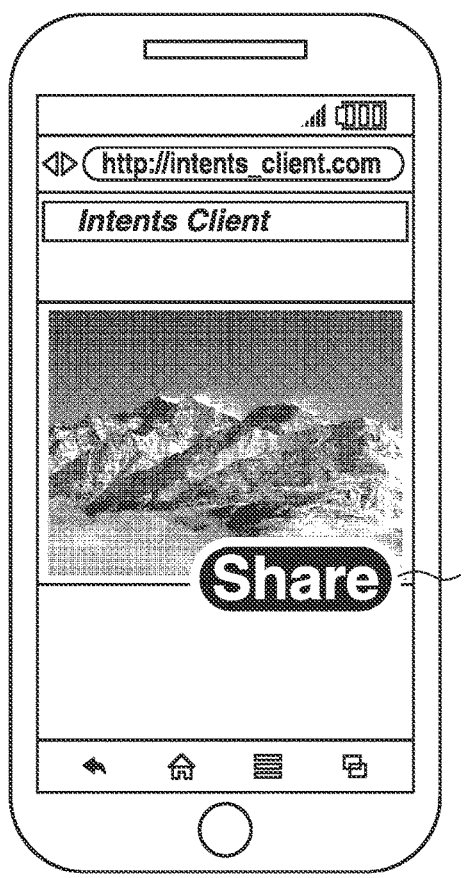
FIGS. 10A, 10B, and 10C illustrate examples of screens displayed on the web browser, respectively.
Figure 10B:
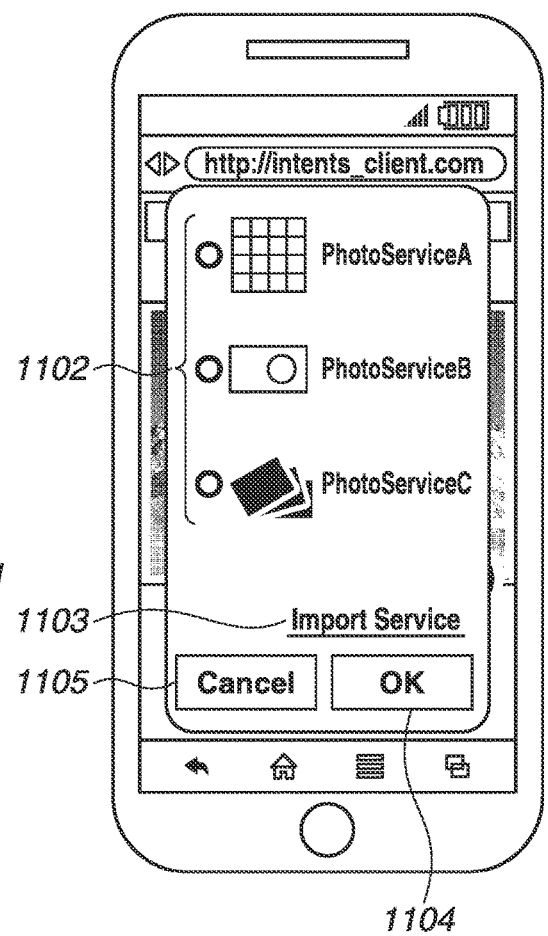
Figure 10C:
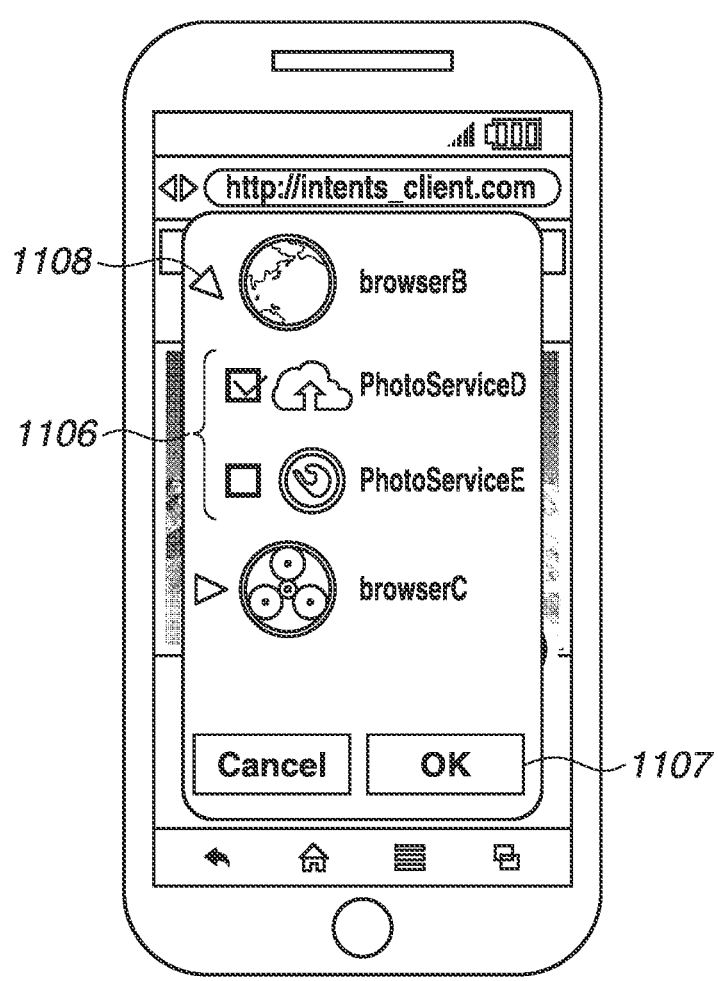

Further, FIGS. 10A, 10B, and 10C illustrate examples of screens displayed on a web browser screen of the UA.1 902, respectively.

Further, FIGS. 11A and 11B, and 12A and 12B are detailed sequence diagrams each illustrating a part of the sequence illustrated in FIG. 9.

In step S1001 illustrated in FIG. 9, the UA.1 902 accesses the client 101 according to a user's instruction. Then, in step S1002, the UA.1 902 receives HTML information that contains an ECMAScript defining a start of processing by a "Share" button from the client 101. Then, a screen illustrated in FIG. 10A is displayed on the web browser screen of the UA.1 902. On this screen, the user can issue a request to share photograph content information to an arbitrary service by providing the photograph content information and pressing the "Share" button 1101.

In step S1003, when the user presses the "Share" button 1101 to instruct the UA.1 902 to use a service, the UA.1 902 detects that the "Share" button 1101 is pressed. When the UA.1 902 detects that the "Share" button 1101 is pressed to thereby determine that the UA.1 902 is instructed to use a service by the user, the processing of the present sequence diagram proceeds to step S1004. In step S1004, the UA.1 902 acquires a list of function information pieces registered in the service information storage unit 911 (FIG. 7) based on the action indicating sharing the photograph content and the data type of the file, and displays a selection screen illustrated in FIG. 10B that includes the acquired function information list (menu) to present this list to the user.

As illustrated in FIG. 10B, the screen displayed in step S1004 includes a function information list 1102, and a link button 1103 labeled "Import Service" that allows the user to refer to function information registered with another UA. Further, this screen also includes an "OK" button 1104 for determining selected function information, and a "Cancel" button 1105 for canceling a selection of function information.

If there is no function information that the user wants to use in the function information list 1102 on the screen illustrated in FIG. 10B that has been displayed in step S1004, the user can use function information registered in another browser. In this case, in step S1005, the user presses the "Import Service" link button 1103 on the screen illustrated in FIG. 10B.

Upon detecting that the "Import Service" link button 1103 is pressed, in steps S1006 and S1007, the UA.1 902 searches for another application that can provide function information in the information processing terminal 501. In the first exemplary embodiment, this sequence will be described as a processing sequence that acquires function information with use of the Intent technique for Android (registered trademark) by way of example. The Intent technique is also a technique that allows data to be transferred between appropriate applications by the OS relaying a data type desired to be transferred and an action desired to be performed on this data, in a similar manner to the Web Intents mechanism.

Now, steps S1006 and S1007 will be described in detail with reference to FIG. 11A.

Figure 11A:
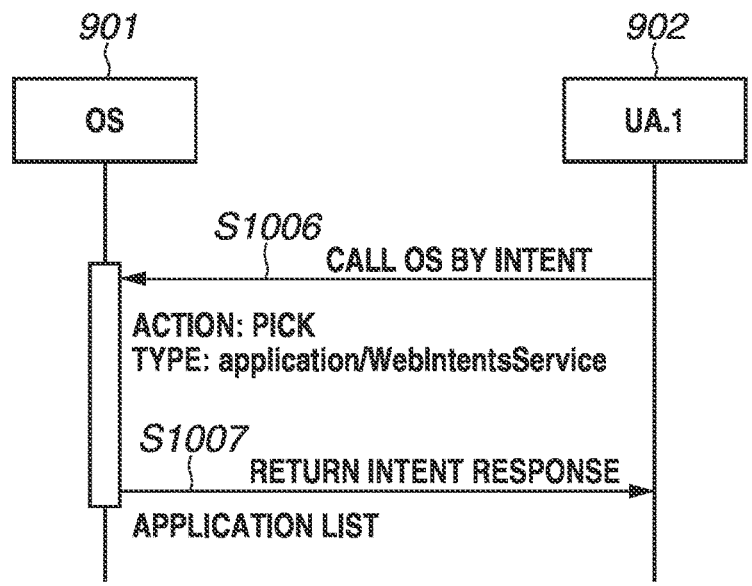
FIGS. 11A and 11B are detailed sequence diagrams each illustrating a part of the sequence illustrated in FIG. 9.

As illustrated in FIG. 11A, in step S1006, the UA.1 902 issues an Intent request to the OS unit 901 while specifying "application/Web Intents Service" as the data type and "pick" as the action for searching for an application that the UA.1 902 can request to provide data. In step S1007, the OS unit 901 acquires a list of applications that can each provide function information of a service by the Intent technique from the application information storage unit 905. Then, the OS unit 901 returns the acquired application list to the UA.1 902 as a UA list via the Intent information input/output unit 904.

Upon acquiring the UA list in step S1007, then in step S1008, the UA.1 902 displays the screen that includes the UA list to present this list to the user. If the user wants to use function information registered in a certain UA (assume that this UA is the UA.2 902 in this example), the user selects the UA.2 902 on this screen. In step S1009, the UA.1 902 detects that the UA.2 902 is selected. Upon this detection, in step S1010, the UA.1 902 issues a request to acquire a list of function information pieces registered with the UA.2 902.

Now, steps S1010 to S1013 will be described in detail with reference to FIG. 11B.

Figure 11B:
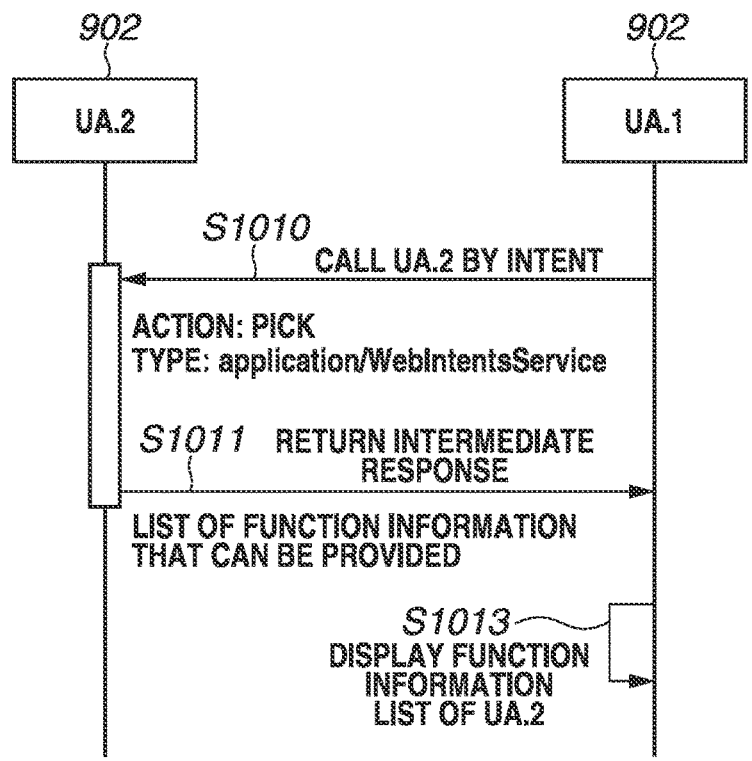

As illustrated in FIG. 11B, in step S1010, the UA.1 902 calls the UA.2 902 by the Intent technique, and requests processing while specifying "application/Web Intents Service" and "pick" as the data type and the action, respectively. In response to this request, the UA.2 902 transmits a list of function information pieces that the UA.2 902 can provide to the UA.1 902 as an intermediate response. This data transmission and reception is performed via the OS unit 901 actually, but is described here while omitting the details.

In step S1011, the UA.1 902 receives the function information list from the UA.2 902. Upon receiving the function information list, in step S1013, the UA.1 902 displays the function information list (menu) of the UA.2 902. FIG. 10C illustrates an example of the screen displayed on the information processing terminal 501 in step S1013. In FIG. 10C, the function information list is displayed in such a manner that a parent-child relationship between the UA list and the list of function information pieces managed by the selected UA is understandable. For example, in FIG. 10C, "PhotoServiceD" and "PhotoServiceE" (1106) are displayed as function information managed by "browserB" as the UA. However, only a list of function information pieces unregistered with the UA.1 902 may be displayed just as it is without the parent-child relationship displayed together. The user presses an "OK" button 1107 with any one or more function information piece(s) selected, thereby determining the selection of the function information. At this time, the UA.1 902 detects that the function information is selected.

In step S1012, the processing for detecting the selection of the UA and acquiring and displaying the list of the function information pieces registered with the selected UA, which is indicated in steps S1009 to S1013, is repeated as many times as the user selects a UA.

In step S1014, the UA.1 902 detects that the function information registered in the UA.2 902 is selected from the above-described function information list. Upon this detection, in step S1015, the UA.1 902 issues a request for acquiring the above-described selected function information to the UA.2 902, and acquires the above-described selected function information in steps S1015 and S1016.

Now, steps S1015 and S1016 will be described in detail with reference to FIG. 12A.

Figure 12A:
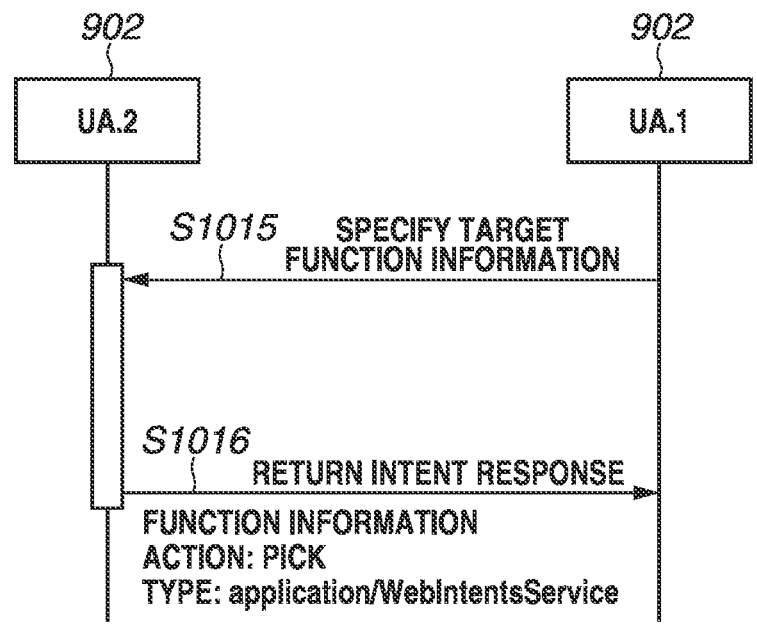
FIGS. 12A and 12B are detailed sequence diagrams each illustrating a part of the sequence illustrated in FIG. 9.

As illustrated in FIG. 12A, in step S1015, the UA.1 902 issues the acquisition request to the UA.2 902 with use of the mechanism of the Intent technique while specifying the function information that is an acquisition target with use of "pick" of the Intent technique. In step S1016, in response to this acquisition request, the UA.2 902 transmits the above-described specified function information as a response to the Intent issued in step S1015. The function information transmitted at this time is a definition file in which the function information is defined as illustrated in FIG. 13.

FIG. 13 illustrates an example of the definition file of the function information that is transmitted from the UA.2 902 in step S1016.

As illustrated in FIG. 13, a name of the function information, a URI that accepts the provided function, an action (action) when the provided function is offered, and a data type (type) are described in the definition file of the function information.

Now, returning to the description of the sequence diagram illustrated in FIG. 9, the following steps are performed subsequently.

Upon acquiring information required to register the function information in step S1016, then in step S1017, the UA.1 902 registers the above-described acquired function information in the UA.1 902. More specifically, the central processing unit 907 in the UA.1 902 stores the function information acquired in step S1016 into the service information storage unit 911 via the service information input/output unit 910. After that, in step S1018, the UA.1 902 displays the selection screen illustrated in FIG. 10B again to present the list of the function information pieces registered with the UA.1 902 to the user. In step S1019, the UA.1 902 detects that certain function information is selected by the user from the function information list displayed in step S1018. Upon this detection, the processing of the present sequence diagram proceeds to step S1020. In step S1020, the UA.1 902 transmits an HTTP request (a Web Intents processing request) for carrying out "share" to a service corresponding to the above-described selected function information (the service 103 in the present example).

Now, steps S1020 and S1021 will be described in detail with reference to FIG. 12B.

Figure 12B:
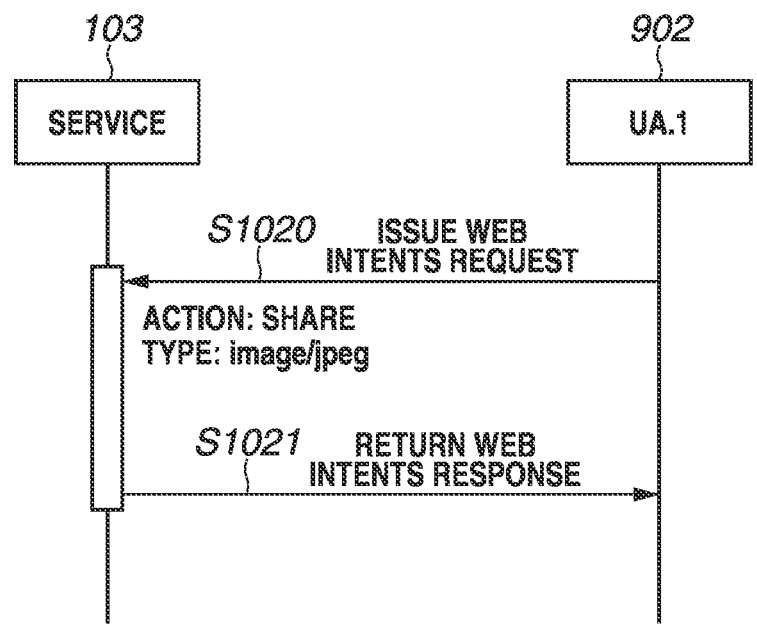

As illustrated in FIG. 12B, in step S1020, the UA.1 902 issues the Web Intents processing request with "image/jpeg" and "share" specified as the data type and the action, respectively, to the service 103. In step S1021, in response to this Web Intents processing request, the service 103 performs processing according to this Web Intents processing request, and returns a result of the execution as a response to the UA.1 902. Then, the UA.1 902 receives the response transmitted in step S1021.

<Example of Flowchart of Processing of UA According to First Exemplar Embodiment>

Figure 14:
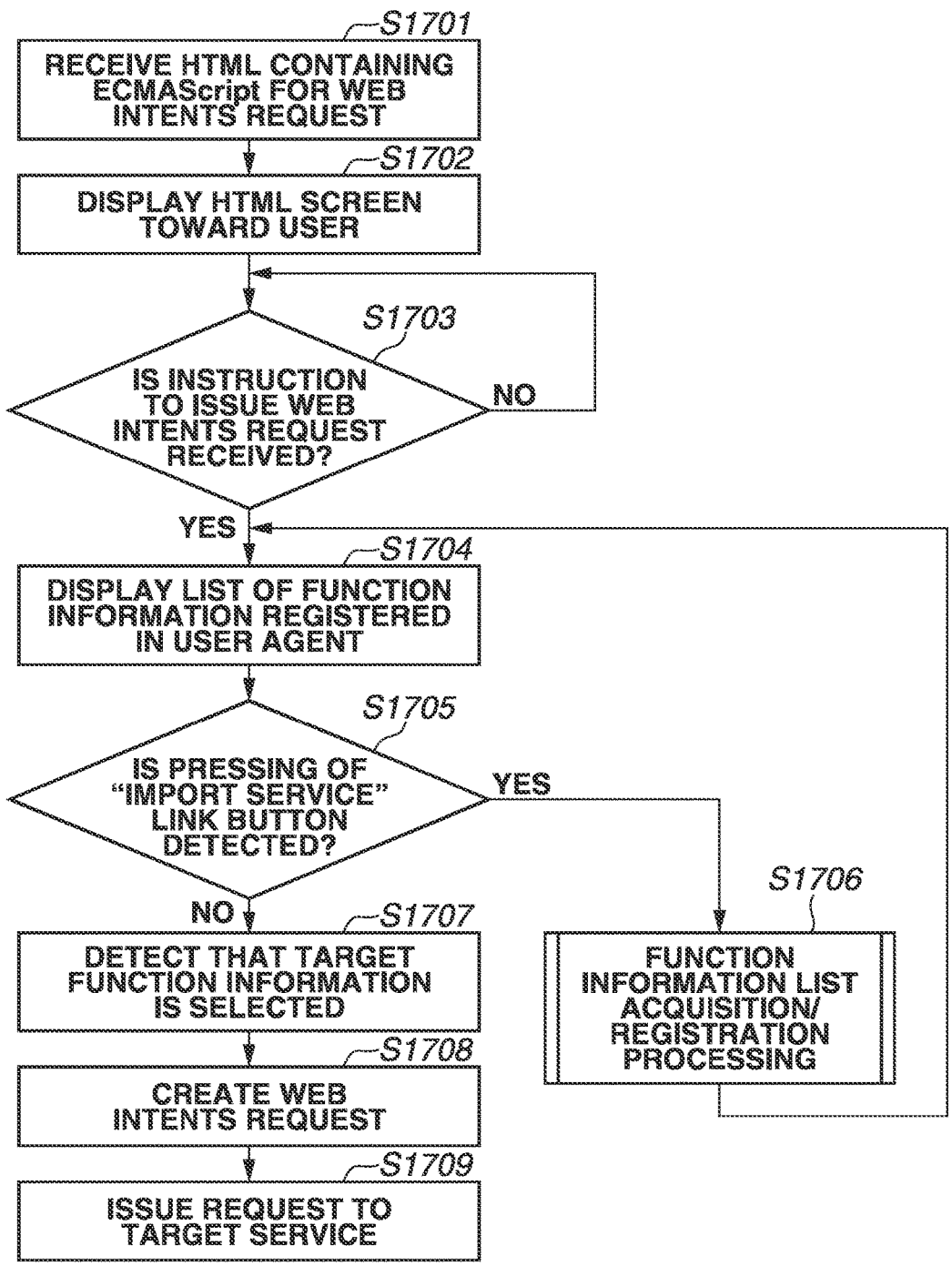
FIG. 14 is a flowchart illustrating processing for mutually using the function information according to the first exemplary embodiment.

FIG. 14 is a flowchart illustrating an example of processing by the software since the UA 106 receives the ECMAScript from the client 101 until the UA 106 acquires the function information from the outside and issues the request to the service 103. The processing illustrated in this flowchart indicates a part of the processing by the software in the information processing terminal 501 illustrated in FIG. 7. The CPU 802 in the information processing terminal 501 loads the program stored in the ROM 803, the storage device 809, or the like into the RAM 804 as necessary to execute the program, by which the processing illustrated in this flowchart is realized.

In step S1701, the network control unit 906 in the information processing terminal 501 receives the HTML that contains the ECMAScript for issuing the Web Intents request from the client 101. Then, the processing of the present flowchart proceeds to step S1702.

In step S1702, the central processing unit 907 constructs a screen based on the received HTML information, and displays the screen illustrated in FIG. 10A via the user input/output unit 903 to present the received information to the user. Then, the processing of the present flowchart proceeds to step S1703. In step S1703, the central processing unit 907 determines whether an instruction to issue the Web Intents request is received from the user via an operation performed on the screen. If the central processing unit 907 detects that the "Share" button 1101 is pressed, the central processing unit 907 determines that an instruction to issue the Web Intents request is received (YES in step S1703).

If the central processing unit 907 determines that no instruction to issue the Web Intents request is received (NO in step S1703), the processing of the present flowchart returns to step S1703, in which the central processing unit 907 waits for an issue instruction from the user. If the information processing terminal 501 receives a request to move to another webpage by a user's instruction, the central processing unit 907 exits from the processing of the present flowchart, and performs processing according to the request, although this case is not illustrated.

On the other hand, if the central processing unit 907 determines that an instruction to issue the Web Intents request is received (YES in step S1703), the processing of the present flowchart proceeds to step S1704. In step S1704, the central processing unit 907 inquires about whether function information corresponding to the above-described Web Intents request is registered to the service information input/output unit 910. If corresponding function information is registered at this time, the central processing unit 907 displays the function information list 1102 illustrated in FIG. 10B via the user input/output unit 903 to present this list to the user. Then, the processing of the present flowchart proceeds to step S1705.

Figure 15:
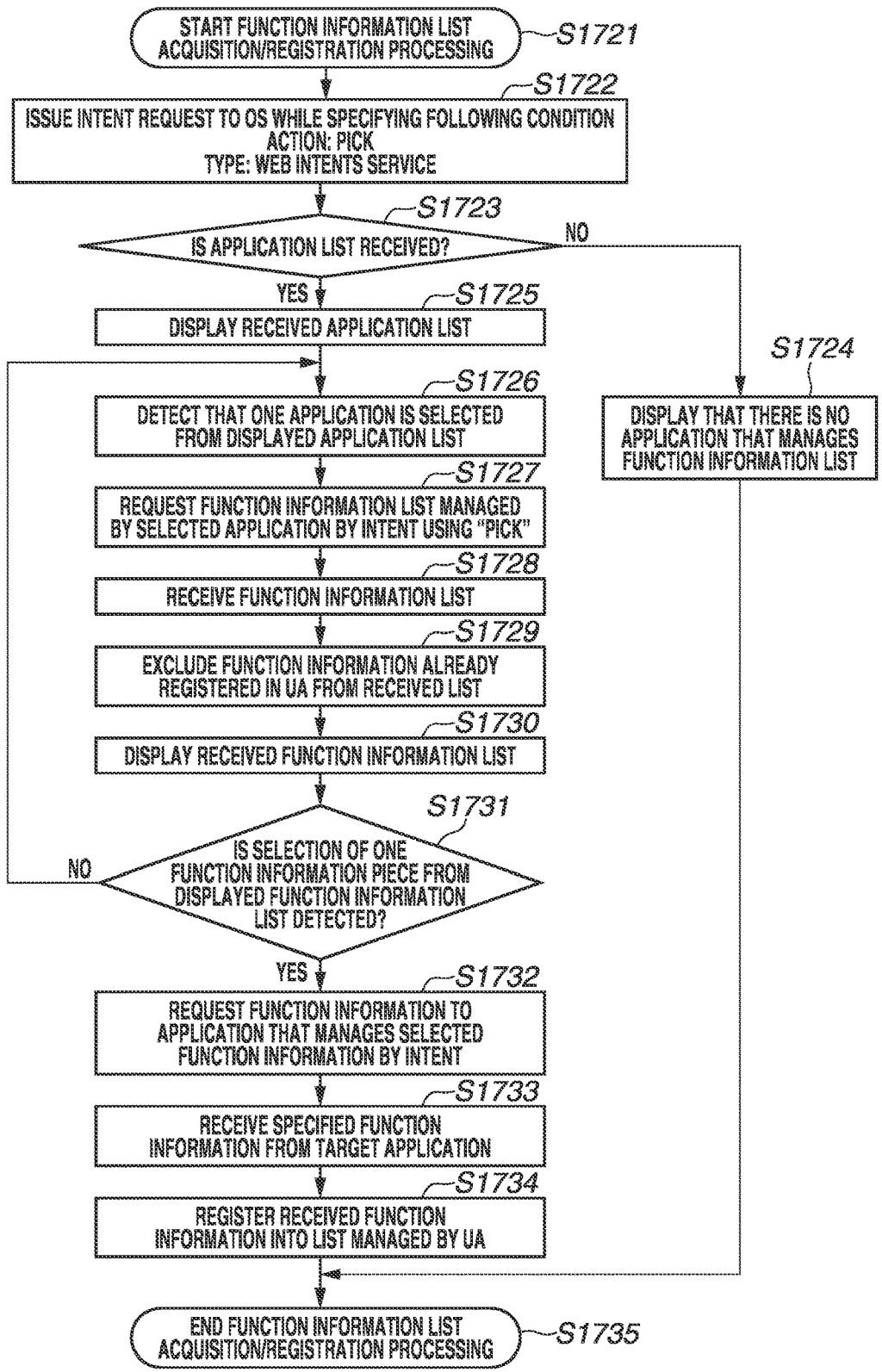
FIG. 15 is a detailed flowchart illustrating processing for acquiring the function information with use of an Intent technique.

In step S1705, the central processing unit 907 determines whether the "Import Service" link button 1103 is pressed on the screen illustrated in FIG. 10B. If the central processing unit 907 determines that the "Import Service" link button 1103 is pressed (YES in step S1705), the processing of the present flowchart proceeds to step S1706. In step S1706, the central processing unit 907 performs function information list acquisition/registration processing. The details of step S1706 according to the first exemplary embodiment are illustrated in FIG. 15 that will be described below. Upon completion of the processing in step S1706, the processing of the present flowchart proceeds to step S1704, in which the central processing unit 907 displays the selection screen for the function information list that includes the information acquired in step S1706 (the screen illustrated in FIG. 10B).

On the other hand, if the central processing unit 907 determines that the "Import Service" link button 1103 is not pressed (NO in step S1705), the processing of the present flowchart proceeds to step S1707. In step S1707, the central processing unit 907 detects that the function information is selected by the user. Then, the processing of the present flowchart proceeds to step S1708. In step S1708, the central processing unit 907 creates the Web Intents request with use of the content information for which the issue instruction has been received in step S1703. Then, the processing of the present flowchart proceeds to step S1709. In step S1709, the central processing unit 907 issues the Web Intents request created in step S1708 to the service corresponding to the function information detected to be selected in step S1707, and then ends the processing of the present flowchart.

<Flowchart of Function Information List Acquisition/Registration Processing>

FIG. 15 is a flowchart illustrating the details of the function information list acquisition/registration processing, performed in step S1706 illustrated in FIG. 14, according to the first exemplary embodiment. The CPU 802 in the information processing terminal 501 loads the program stored in the ROM 803, the storage device 809, or the like into the RAM 804 as necessary to execute the program, by which the processing illustrated in this flowchart is realized.

In step S1721, the central processing unit 907 starts the function information list acquisition/registration processing indicated in step S1706 illustrated in FIG. 14. Then, the processing of the present flowchart proceeds to step S1722. In step S1722, the central processing unit 907 issues the Intent request to the OS unit 901 while specifying "pick" and "Web Intents Service" as the action and the data type, respectively. Then, the processing of the present flowchart proceeds to step S1723.

In step S1723, the central processing unit 907 determines whether the application list is received from the OS unit 901 as a response to the request issued by the Intent technique. If the central processing unit 907 determines that no application list can be received from the OS unit 901 (NO in step S1723), the processing of the present flowchart proceeds to step S1724. In step S1724, the information processing terminal 501 notifies the user that no corresponding application is found out in the device despite a search for a corresponding application by the Intent technique (for example, displays a message). Then, in step S1735, the central processing unit 907 ends the present function information list acquisition/registration processing.

On the other hand, if the central processing unit 907 determines that the application list is received from the OS unit 901 (YES in step S1723), the processing of the present flowchart proceeds to step S1725. In step S1725, the central processing unit 907 displays the application list acquired in step S1723 on the display 814 via the user input/output unit 903 to present the application list to the user. Then, the processing of the present flowchart proceeds to step S1726.

In step S1726, the central processing unit 907 detects that a single application is selected by the user from the application list displayed in step S1725. Then, the processing of the present flowchart proceeds to step S1727. In step S1727, the central processing unit 907 requests a list of function information pieces corresponding to the action "pick" and the date type "Web Intents Service" to the application selected in step S1726 with use of the Intent technique. Then, the processing of the present flowchart proceeds to step S1728.

In step S1728, the central processing unit 907 receives the function information list requested in step S1727. Then, the processing of the present flowchart proceeds to step S1729. In step S1729, the central processing unit 907 compares the function information list received in step S1728, and the function information already registered in the service information storage unit 911. The central processing unit 907 excludes the already registered function information as a result of this comparison. Then, the processing of the present flowchart proceeds to step S1730.

In step S1730, the central processing unit 907 displays the received function information list on the display 814 via the user input/output unit 903. At this time, the central processing unit 907 displays the screen illustrated in FIG. 10C.

In the example illustrated in FIG. 10C, in step S1726, the central processing unit 907 displays the application list that includes "browserB" and "browserC". If the user wants to acquire the function information list registered in "browserB", the user touches "browserB". Then, in step S1730, the central processing unit 907 displays the function information list 1106 registered in "browserB" while tilting a triangle on the left side of the screen, which indicates a directory structure, as indicated by a triangle 1108. The user selects one or more function information pieces that the user wants to introduce into the application from this function information list 1106.

Now, returning to the description of the flowchart illustrated in FIG. 15, the following steps are performed subsequently.

After the central processing unit 907 detects an operation performed on the screen displayed in step S1730, the processing of the present flowchart proceeds to step S1731. In step S1731, the central processing unit 907 determines whether a selection of function information that is to be introduced from the function information list displayed in step S1730 is detected. If the central processing unit 907 determines that no selection of function information is detected but a selection of an application (for example, "browserC") is detected (NO in step S1731), the processing of the present flowchart proceeds to step S1726.

On the other hand, if the central processing unit 907 determines that a selection of function information that is to be introduced from the function information list displayed in step S1730 is detected (YES in step S1731), the processing of the present flowchart proceeds to step S1732. In step S1732, the central processing unit 907 requests the above-described selected function information to the application that manages this selected function information with use of the Intent technique. Then, the processing of the present flowchart proceeds to step S1733.

In step S1733, the central processing unit 907 receives the above-described selected function information from the above-described target application. Then, the processing of the present flowchart proceeds to step S1734. In step S1734, the central processing unit 907 registers the received function information into the service information storage unit 911 via the service information input/output unit 910. Then, in step S1735, the central processing unit 907 ends the function information list acquisition/registration processing.

As understood from the above description, when there is a plurality of UAs in a same information processing terminal, it is possible to acquire function information of a service registered in another UA from this UA to then utilize this function information with use of the mechanism of the Intent technology. Therefore, when there is a plurality of UAs in a same information processing terminal, it becomes possible to share function information pieces of services separately registered with the respective UAs.

In the above-described first exemplary embodiment, the configuration that acquires function information managed by another UA with use of, for example, the Intent technique designed for platforms based on Android (registered trademark), has been described. On the other hand, in the second exemplary embodiment, the configuration that acquires function information from another UA with use of the Web Intents mechanism developed by World Wide Web Consortium (W3C), instead of using the Intent technique, will be described.

The service information management unit 908 in the application unit 902 illustrated in FIG. 7 has a function as an HTTP client. The service information management unit 908 issues a request to acquire function information to an external application. Further, upon receiving the function information transmitted from the external application in response to this acquisition request, the service information management unit 908 issues a request to store the Web Intents service information to the service information input/output unit 910 via the central processing unit 907.

Further, the service information management unit 908 has a function as a Web Intents service. Upon receiving a request to acquire function information together with the action and the date type information from an external application with use of the Web Intents mechanism, the service information management unit 908 acquires the function information from the service information storage unit 911 via the central processing unit 907 and the service information input/output unit 910, and provides the acquired function information to the request source.

<Example of Another Sequence Diagram Regarding Mutual Use of Function Information>

Figure 16B:
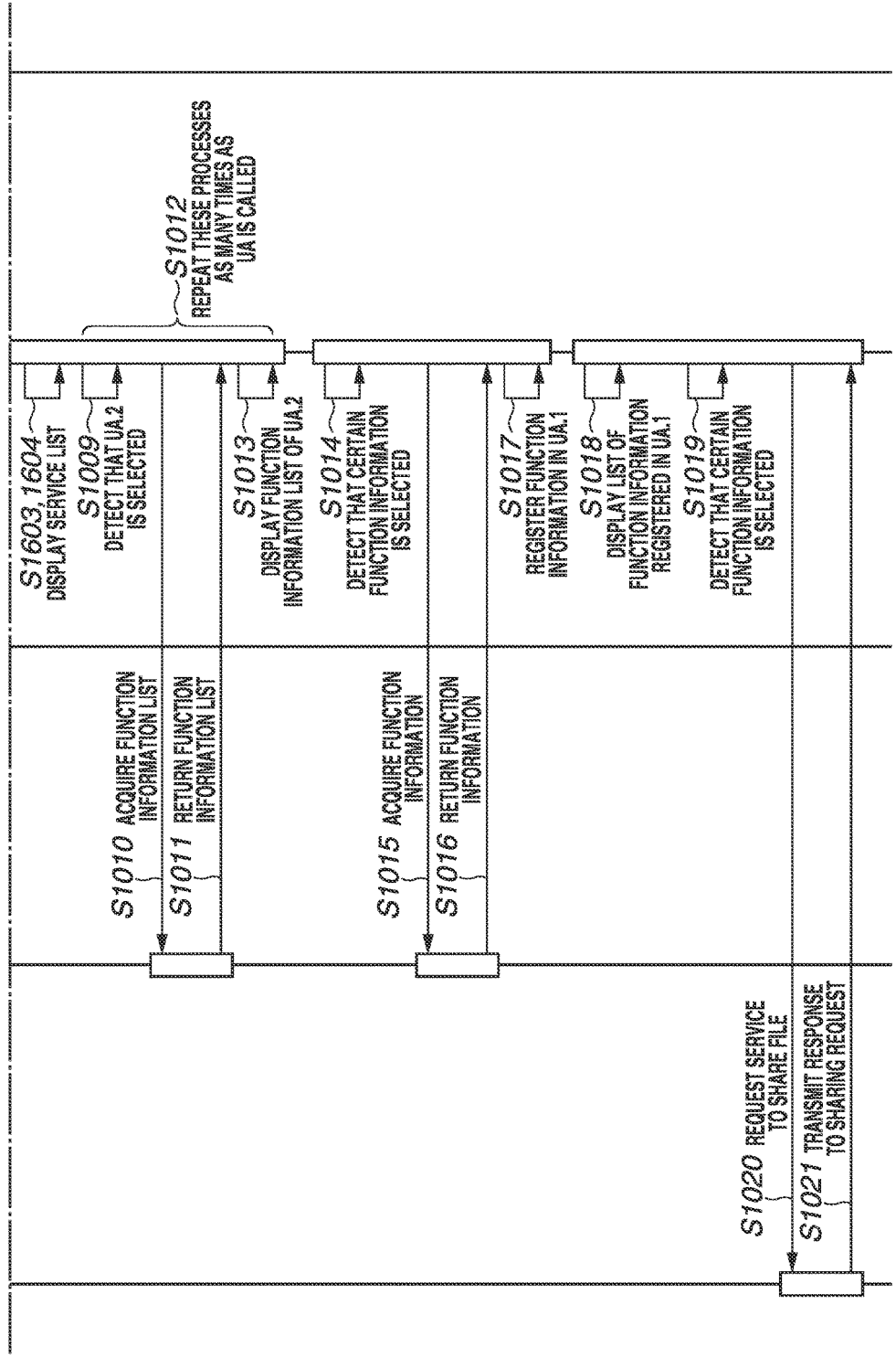
FIG. 16 (consisting of FIGS. 16A and 16B) is a sequence diagram illustrating an operation of mutually using the function information according to a second exemplary embodiment.

FIG. 16 (consisting of FIGS. 16A and 16B) is a sequence diagram illustrating an example of another operation of referring to and using a list of function information pieces managed by another web browser according to the second exemplary embodiment. Similar steps to the steps illustrated in FIG. 9 are denoted by the same step numbers as the step numbers used in FIG. 9. In the following description, only differences from FIG. 9 will be described.

FIG. 17 is a detailed sequence diagram illustrating a part of the sequence illustrated in FIG. 16.

The processes of steps 1001 to S1005 are similar to those in FIG. 9, and therefore descriptions thereof are omitted here. When the function information list acquired from the service information storage unit 911 does not include function information corresponding to a function that the user wants to use, the information processing terminal 501 according to the second exemplary embodiment searches a local area network (local network) 1501 for an application or a service (hereinafter simply referred to as a service) that can provide function information. More specifically, upon detecting that the "Import Service" link button 1103 (FIG. 10B) is pressed by the user in step S1005, in step S1601, the UA.1 902 searches the local network 1501 for a service. Now, this search in the network will be described in detail with reference to FIG. 17.

As illustrated in FIG. 17, in step S1601, the UA.1 902 searches the local network 1501 for a service. In the present example, the UA.1 902 searches for a network service in a link local network with use of, for example, a Multicast Domain Name System (DNS) technique employed in Bonjour developed by Apple Inc., which is a Zero-configuration technique.

In step S1602, the UA.1 902 receives a response from each service. Since the UA.1 902 searches the local network 1501 according to the present exemplary embodiment, the UA.1 902 can also receive a response from a service located within a range that the network can cover, in addition to receiving a response from a service in the same information processing terminal 501.

Subsequently, in step S1603, the UA.1 902 detects services corresponding to "application/Web Intents Service" as the data type and providing "pick" as the action from the services received in step S1602, and creates a list therefrom. If the UA.1 902 cannot acquire sufficient information required for the detection at this time, the UA.1 902 may acquire the sufficient information by accessing each service from which the UA1. 902 has received the response in the step S1602. This processing allows the UA.1 902 to search for a service that is located in the local area network and can provide function information.

Subsequently, in step S1604, the UA.1 902 displays the list of the services detected in step S1603 to present this list to the user. Then, the processing of the present sequence diagram proceeds to step S1009. Processes after that are similar to FIG. 9, and therefore descriptions thereof are omitted blow.

<Flowchart of Function Information List Acquisition/Registration Processing According to Second Exemplary Embodiment>

FIG. 18 is a flowchart illustrating the details of the function information list acquisition/registration processing performed in step S1706 illustrated in FIG. 14 according to the second exemplary embodiment. The CPU 802 in the information processing terminal 501 loads the program stored in the ROM 803, the storage device 809, or the like into the RAM 804 as necessary to execute the program, by which the processing illustrated in this flowchart is realized.

In step S1741, the central processing unit 907 starts the function information list acquisition/registration processing in step S1706 illustrated in FIG. 14. Then, the central processing unit 907 instructs and causes the service information management unit 908 to perform a process of step S1742. In step S1742, the service information management unit 908 searches the local network 1501 for an application or a service (hereinafter simply referred to as a service) that provides a function using the Web Intents mechanism (corresponding to steps 1601 to 1604 illustrated in FIGS. 16 and 17). The search target is a service with "pick" and "Web Intents Service" set as the action and the data type, respectively. A search request is issued with use of a service search protocol such as the Multicast DNS technique employed in Bonjour developed by Apple Inc. or the like.

Subsequently, in step S1743, the service information management unit 908 determines whether one or more corresponding services are found out as a result of the search in step S1742. If the service information management unit 908 determines that no corresponding service can be found out (NO in step S1743), the processing of the present flowchart proceeds to step S1744. In step S1744, the service information management unit 908 notifies the user that no corresponding service can be found out in a network search range as a result of the search for a service via the central processing unit 907 (for example, displays a message). Then, in step S1755, the service information management unit 908 ends the function information list acquisition/registration processing.

On the other hand, if the service information management unit 908 determines that one or more corresponding service(s) are found out (YES in step S1743), the processing of the present flowchart proceeds to step S1745. In step S1745, the service information management unit 908 displays the list of the services acquired via the user input/output unit 903 in step S1743, via the central processing unit 907. Then, the processing of the present flowchart proceeds to step S1746.

In step S1746, the service information management unit 908 detects that a single service is selected by the user from the service list displayed in step S1745, via the central processing unit 907. Then, the processing of the present flowchart proceeds to step S1747. In step S1747, the service information management unit 908 requests a list of function information pieces corresponding to the action "pick" and the data type "Web Intents Service", to the service selected in step S1746 with use of the Web Intents mechanism. Then, the processing of the present flowchart proceeds to S1748.

In step S1748, the service information management unit 908 receives the function information list requested in step S1747. Then, the processing of the present flowchart proceeds to step S1749. In step S1749, the service information management unit 908 compares the function information list received in step S1748, and the function information already registered in the service information storage unit 911 via the central processing unit 907. The service information management unit 908 excludes the already registered function information as a result of this comparison. Then, the processing of the present flowchart proceeds to step S1750.

In step S1750, the service information management unit 908 displays the above-described function information list via the central processing unit 907 and the user input/output unit 903. At this time, the service information management unit 908 displays, for example, the screen illustrated in FIG. 10C. If the user wants to acquire a list of function information pieces registered in a certain application, the user touches "browserB". Then, the screen shifts to such a state that the triangle on the left side of the screen, which indicates the directory structure, is tilted as indicated by the triangle 1108, and the function information list 1106 indicated in step S1750 is displayed. The user selects one or more function information pieces that the user wants to introduce into the application from this function information list 1106.

Now, returning to the description of the flowchart, the following steps are performed subsequently.

After the service information management unit 908 detects an operation performed on the screen displayed in step S1750, the processing of the present flowchart proceeds to step S1751. In step S1751, the service information management unit 908 determines whether a selection of function information that is to be introduced from the function information list displayed in step S1750 is detected via the central processing unit 907. If the service information management unit 908 determines that no selection of function information is detected but a selection of an application (for example, "browserC") is detected (NO in step S1751), the processing of the present flowchart proceeds to step S1746.

On the other hand, if the service information management unit 908 determines that a selection of function information that is to be introduced from the function information list displayed in step S1750 is detected (YES in step S1751), the processing of the present flowchart proceeds to step S1752. In step S1752, the service information management unit 908 requests the function information to the service that manages the above-described selected function information with use of the Web Intents mechanism. Then, the processing of the present flowchart proceeds to step S1753.

In step S1753, the service information management unit 908 receives the above-described selected function information from the above-described target service. Then, the processing of the present flowchart proceeds to step S1754. In step S1754, the service information management unit 908 registers the received function information into the service information storage unit 911 via the central processing unit 907 and the service information input/output unit 910. Then, in step S1755, the service information management unit 908 ends the function information list acquisition/registration processing.

As understood from the above description, when there is a plurality of UAs in a same information processing terminal, it becomes possible to acquire and use function information pieces of services separately registered for each UA with use of the Web Intents mechanism.

In the first exemplary embodiment, the example that realizes mutual use of the function information of the function provided by the service between the applications inside the information processing terminal 501 with use of the Intent technique, has been described. Further, in the second exemplary embodiment, the example that realizes mutual use of the function information with the application in the local network with use of the Web Intents mechanism, has been described.

However, when the user tries to acquire the function information, the other side of the mutual use does not necessarily have to be an application or a service within the apparatus or the local network, and may be a service in the Internet. For example, when registering function information in a web browser as the UA, the user also registers this function information in a service that manages a function information list in the Internet. After that, the user tries to use a service on another web browser, and presses the "Import Service" link button 1103 illustrated in FIG. 10B. Then, the web browser is connected to the service that manages the function information list in the Internet, and issues a request to acquire the function information list. This configuration allows the function information list to be mutually used even between both sides of the mutual use that are not applications in the local network, thereby succeeding in acquiring an effect similar to the first and second exemplary embodiments.

When the user tries to acquire the function information list with use of the Web Intents mechanism as described according to the second embodiment, there may be function information that is usable on some web browsers but is unusable on the user's own web browser. For example, suppose that a URL of a function provided by a service existing in the information processing terminal 501 is a URL indicating a local loopback address (http://127.0.0./ . . . ). Providing the function information including such a URL to the web browser that is the request source does not allow the web browser to which the function information is provided (the web browser that is the request source) to use the provided function of the service corresponding to this function information via the network.

In such a case, the web browser on the provider-side is configured to provide only usable function information according to a condition of the web browser that has requested the function information (the request-side). Further, in some cases, a function provided by a service may be used while not only a URL but also a special action and type are defined. Therefore, the provider-side is configured to provide only function information usable by the request side according to the action and the type requested by the request side. This configuration can prevent the function information unusable by the request source as described above from being wastefully registered, thereby improving the user's convenience.

Further, another possible method to avoid this inconvenience is that the web browser, which has received the function information, determines whether the function information is usable by the web browser itself when acquiring the function information, and does not display this function information to the user as a selectable choice if the received function information is unusable. This configuration can also prevent, for example, the function information unusable by the request source from being wastefully registered in a similar manner, thereby improving the user's convenience.

In this manner, according to the exemplary embodiments of the present invention, it is possible to improve the usability regarding the new cooperation mechanism such as the currently proposed Web Intents mechanism. For example, when a single information processing terminal includes a plurality of relay functions required to realize the new mechanism for cooperation among web services, such as the Web Intents mechanism, the exemplary embodiments of the present invention allow these relay functions to appropriately share at least a part of the function information among them. As a result, the user can be released from the necessity of repeatedly registering a same provided function for each relay function, whereby the user's convenience can be improved.

The structures and the contents of the above-described various kinds of data are not limited to the described ones, and it is to be understood that they can have any of various structures and contents according to an intended use and a purpose.

The exemplary embodiments have been described above, but the present invention can be also embodied as, for example, a system, an apparatus, a method, a program, or a storage medium. More specifically, the present invention may be applied to a system including a plurality of devices, and may be also applied to an apparatus including only a single device.

Further, all of configurations generated by combining the above-described respective exemplary embodiments are also included in the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-015339 filed Jan. 30, 2014, which is hereby incorporated by reference herein in its entirety.

What is claimed is:

1. An information processing terminal communicating with a client via a network, wherein the client provides HTML (Hyper Text Markup Language) data including descriptions related to data to be shared and a share object to be displayed in a window via a user agent (UA), the information processing terminal comprising:
    a memory storing instructions related to a web browser of the information processing terminal; and
    a processor which is capable of executing the instructions causing the information processing terminal to:
        display a page including the share object based on the HTML data received from the client, wherein the HTML data includes descriptions related to a first function executed in response to an operation to the share object displayed on the page and, in the first function, descriptions related to the data to be shared and descriptions related to a second function using a navigator interface to provide a selection screen for selecting a service are defined;
        make a request for function information, by executing the first function in response to a user instruction to the share object via the displayed page, from the web browser to an operating system (OS) of the information processing terminal;
        receive function information from the OS based on the request;
        present, according to the second function a selection screen for selecting one of services corresponding to the received function information; and
        issue a share request for the data to be shared in response to a selection via the selection screen,
    wherein the function information is information for calling, from the web browser, the service provided by a service provider different from the OS, and
    wherein, after the share request is issued, the service provider providing the service corresponding to the selection via the selection screen receives the data to be shared.

2. The information processing terminal according to claim 1, wherein the instructions cause the information processing terminal to perform a search for another web browser, wherein the request is made to the another web browser as a result of the search.

3. The information processing terminal according to claim 2, wherein the search is performed within the information processing terminal.

4. The information processing terminal according to claim 1, wherein the network is the Internet.

5. The information processing terminal according to claim 1, wherein the service provider and the web browser are applications that operate on the information processing terminal.

6. The information processing terminal according to claim 1, wherein the presented selection screen includes service icons corresponding respectively to the services corresponding to the received function information.

7. An method for an information processing terminal communicating with a client via a network, wherein the client provides HTML (Hyper Text Markup Language) data including descriptions related to data to be shared and a share object to be displayed in a window via a user agent (UA), the method comprising:
   storing instructions related to a web browser of the information processing terminal;
   displaying a page including the share object based on the HTML data received
from the client, wherein the HTML data includes descriptions related to a first function executed in response to an operation to the share object displayed on the page and, in the first function, descriptions related to the data to be shared and descriptions related to a second function using a navigator interface to provide a selection screen for selecting a service are defined;
   making a request for function information, by executing the first function in response to a user instruction to the share object via the displayed page, from the web browser to an operating system (OS) of the information processing terminal;
   receiving function information from the OS based on the request;
   presenting, according to the second function, a selection screen for selecting one of services corresponding to the received function information; and
   issuing a share request for the data to be shared in response to a selection via
the selection screen,
   wherein the function information is information for calling, from the web browser, the service provided by a service provider different from the OS, and
   wherein, after the share request is issued, the service provider providing the service corresponding to the selection via the selection screen receives the data to be shared.

8. The method according to claim 7, further comprising performing a search for another web browser,
   wherein the request is made to the another web browser as a result of the search.

9. The method according to claim 8, wherein the search is performed within the information processing terminal.

10. The method according to claim 7, wherein the network is the Internet.

11. The method according to claim 7, wherein the service provider and the web browser are applications that operate on the information processing terminal.

12. The method according to claim 7, wherein the presented selection screen includes service icons corresponding respectively to the services corresponding to the received function information.

13. A non-transitory computer readable storage medium on which is stored a computer program for making a computer execute a control method for an information processing terminal communicating with a client via a network, wherein the client provides HTML (Hyper Text Markup Language) data including descriptions related to data to be shared and a share object to be displayed in a window via a user agent (UA), the method comprising:
   storing instructions related to a web browser of the information processing terminal;
   displaying a page including the share object based on the HTML data received from the client, wherein the HTML data includes descriptions related to a first function executed in response to an operation to the share object displayed on the page and, in the first function, descriptions related to the data to be shared and descriptions related to a second function using a navigator interface to provide a selection screen for selecting a service are defined;
   making a request for function information, by executing the first function in response to a user instruction to the share object via the displayed page, from the web browser to an operating system (OS) of the information processing terminal;
   receiving function information from the OS based on the request;
   presenting, according to the second function, a selection screen for selecting one of services corresponding to the received function information; and
   issuing a share request for the data to be shared in response to a selection via
the selection screen,
   wherein the function information is information for calling, from the web browser, the service provided by a service provider different from the OS, and
   wherein, after the share request is issued, the service provider providing the service corresponding to the selection via the selection screen receives the data to be shared.

14. The non-transitory computer readable storage medium according to claim 13, further comprising performing a search for another web browser,
   wherein the request is made to the another web browser as a result of the search.

15. The non-transitory computer readable storage medium according to claim 14, wherein the search is performed within the information processing terminal.

16. The non-transitory computer readable storage medium according to claim 13, wherein the network is the Internet.

17. The non-transitory computer readable storage medium according to claim 13, wherein the service provider and the web browser are applications that operate on the information processing terminal.

18. The non-transitory computer readable storage medium according to claim 13, wherein the presented selection screen includes service icons corresponding respectively to the services corresponding to the received function information.

* * * * *